US 6,689,193 B1

(12) United States Patent
Hosoe et al.

(10) Patent No.: US 6,689,193 B1
(45) Date of Patent: Feb. 10, 2004

(54) HYDROGEN STORAGE ALLOY POWDER AND METHOD FOR PRODUCING THE SAME

(75) Inventors: Mitsuya Hosoe, Saitama (JP); Izuru Kanoya, Saitama (JP); Junichi Kitagawa, Saitama (JP); Terumi Furuta, Saitama (JP); Takanori Suzuki, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/018,740
(22) PCT Filed: Jun. 26, 2000
(86) PCT No.: PCT/JP00/04176
§ 371 (c)(1),
(2), (4) Date: Apr. 25, 2002
(87) PCT Pub. No.: WO01/00891
PCT Pub. Date: Jan. 4, 2001

(30) Foreign Application Priority Data

Jun. 24, 1999 (JP) .............................. 11-178710
Sep. 21, 1999 (JP) .............................. 11-267553
Sep. 21, 1999 (JP) .............................. 11-267554

(51) Int. Cl.$^7$ .................................................. B22F 9/04
(52) U.S. Cl. ...................... 75/352; 75/360; 420/900
(58) Field of Search ..................... 75/352, 354, 360; 420/900

(56) References Cited

U.S. PATENT DOCUMENTS 5,145,513 A * 9/1992 Matteazzi et al. ............ 75/255
5,162,108 A * 11/1992 Bogdanovic ................. 420/900
5,837,030 A * 11/1998 Schulz et al. ................. 75/352
5,916,381 A * 6/1999 Sapru et al. ................. 420/900
6,478,844 B1 * 11/2002 Ovshinsky ................... 75/352

FOREIGN PATENT DOCUMENTS

| JP | A-8-311596 | 11/1996 |
| JP | A-10-259436 | 9/1998 |
| JP | A-2000-265233 | 9/2000 |
| WO | WO 96 19594 A | 6/1996 |

OTHER PUBLICATIONS

Boundary, vol. 12, No. 4, P. 36–41 (1996) Moichi Orishige et al.

"Mechanical alloying of Mg–Ni compounds under hydrogen and inert atmosphere"; J. Hout, E. Akiba, T. Takada; Journal of Alloys and Compounds, Elsevier Sequoia, Lausanne, Ch, Vo. 231; Dec. 15, 1995, ppgs. 815–819.

Supplementary European Search Report; EP 00 94 0834; dated Apr. 4, 2003.

International Publication No. WO 96/19594, published Jun. 27, 1996.

* cited by examiner

Primary Examiner—George Wyszomierski
(74) Attorney, Agent, or Firm—Arent Fox Kintner Plotkin & Kahn, PLLC

(57) ABSTRACT

To produce a hydrogen absorbing alloy powder, a starting powder and a plurality of balls are thrown into a container of a ball mill, and then, the inside of the container is maintained in a hydrogen atmosphere to conduct a mechanical alloying.

8 Claims, 25 Drawing Sheets

EXAMPLE (1)

HYDROGEN STORAGE ALLOY POWDER AND METHOD FOR PRODUCING THE SAME

FIELD OF THE INVENTION

The present invention relates to a hydrogen absorbing alloy powder and a process for producing the same.

BACKGROUND ART

It is a conventional practice that a hydrogen absorbing alloy powder is produced through various steps such as melting, casting, thermal treatment, pulverizing and classification, and the hydrogen absorbing alloy powder is used after being subjected to an activating treatment.

However, the conventional hydrogen absorbing alloy powder suffers from a problem that because the powder is subjected to the activating treatment requiring a lot of time and much amount of heat, the production cost is correspondingly high.

In addition, in general, the hydrogen absorbing alloy powder is used in a fine powdery state having a particle size equal to or smaller than 100 µm, and hence, such powder is liable to be oxidized in the atmospheric air. To prevent the oxidation, the hydrogen absorbing alloy powder must be maintained and handled in an inert atmosphere, but this brings about the degradation of the handling operability.

DISCLOSURE OF THE INVENTION

Accordingly, it is an object of the present invention to provide a process for producing a hydrogen absorbing alloy powder by utilizing peculiar mechanical alloying, wherein a hydrogen absorbing alloy powder, which has an excellent PCT characteristic without being subjected to the conventional activating treatment and can be handled in the atmospheric air without hindrance, can be produced.

To achieve the above object, according to the present invention, there is provided a process for producing a hydrogen absorbing alloy powder, comprising the steps of throwing a starting powder into a ball mill, in which an AE powder comprising at least one alloy element AE selected from the group consisting of Ti, V, Mn, Fe, Ni, Cu and Al, and an Mg powder are weighed so that an alloy composition comprises an amount of AE in a range of 0.1% by weight≦AE≦20% by weight and the balance of Mg, and subjecting the starting powder to a mechanical alloying in a hydrogen atmosphere to provide a hydrogen absorbing alloy powder comprising an Mg alloy powder.

When the hydrogen absorbing alloy powder is hydrogenated, the most time and amount of heat are required in a first hydrogenating course after the production of the hydrogen absorbing alloy powder. For this reason, the conventional activating treatment is a consideration.

In the present invention, the mechanical alloying is carried out in the hydrogen atmosphere and hence, the hydrogen absorbing alloy powder after being produced contains a large amount of a metal hydride, namely, the hydrogen absorbing alloy powder is one produced as if via the first hydrogenating course in the conventional activating treatment. Therefore, if the hydrogen absorbing alloy powder is subjected to a dehydrogenating thermal treatment in vacuum or in a hydrogen atmosphere, hydrogen is desorbed from the metal hydride, and the hydrogen absorbing alloy powder, which has not been hydrogenated, is also activated simultaneously by the migration of the desorbed hydrogen between the grains. In this manner, the sufficiently activated hydrogen absorbing alloy powder can be produced. This hydrogen absorbing alloy powder has an excellent PCT characteristic.

Moreover, the hydrogen absorbing alloy powder containing the large amount of the metal hydride is stable, as compared with a hydrogen absorbing alloy powder containing no metal hydride. Therefore, even if the hydrogen absorbing alloy powder is handled in the atmospheric air, an adverse influence to the PCT characteristic due to the oxidation and the like is inhibited largely. However, if the content of the alloy element AE is lower than 0.1% by weight, the amount of very small grains produced, present in Mg crystal grains or grain boundaries, is insufficient and hence, an excellent hydrogen-absorbing/desorbing characteristic (PCT characteristic) cannot be obtained. On the other hand, if AE>20% by weight, Vf (the volume fraction) of the matrix is reduced and hence, a hydrogen storage capacity equal to or higher than 6% by weight cannot be obtained.

According to the present invention, there is provided a process for producing a hydrogen absorbing alloy powder, comprising the steps of throwing a starting powder into a container of a ball mill, and charging hydrogen into the container to conduct a mechanical alloying, hydrogen being charged again into the container at an intermediate stage of the mechanical alloying.

With such process, the hydrogen absorbing alloy powder can be hydrogenated sufficiently.

It is another object of the present invention to provide a hydrogen absorbing alloy powder having a high hydrogenating speed and a high dehydrogenating speed without being subjected to an activating treatment, and having an improved thermodynamic characteristic.

To achieve the above object, according to the present invention, there is provided a hydrogen absorbing alloy powder, which comprises an amount of nickel (Ni) in a range of 2.1% by weight≦Ni≦47.2% by weight, an amount of AE in a range of 0.1% by weight≦AE≦16.3% by weight and the balance of Mg, the AE being at least one alloy element selected from the group consisting of Ti, V, Mn, Fe, Zr and Cu, and a plurality of very small grains having an average grain size $\underline{d}$ equal to or smaller than 20 nm being dispersed in each of Mg crystal grains constituting a matrix and in each of grain boundaries. The term "grain size $\underline{d}$" means a length of the longest portions of the very small grains in a photomicrographic structure diagram (or a photomicrograph showing a metallographic structure). This applies to the Mg crystal grains and the like.

The very small grains are produced by adding the alloy element AE to the Mg—Ni based alloy component and subjecting them to the mechanical alloying. The very small grains exist stably, and the coalescence of the very small grains is not observed in hydrogen-absorbing/releasing courses.

Such very small grains have an effect of promoting the adsorption of hydrogen molecules to surfaces of the Mg crystal grains and the dissociation of the adsorbed hydrogen molecules to hydrogen atoms in the hydrogen-absorbing course. Due to a difference between distances between atom faces generated between Mg atoms and the very small grains within each of the Mg crystal grains, an elastic strain field is produced in an interface area of the very small grains, and is an energetically high and highly active area. A plurality of such highly active areas exist in the Mg crystal grains and hence, an inactive Mg phase is activated, whereby the diffusion of hydrogen atoms into the Mg crystal grains is promoted. In this manner, the hydrogenating speed is increased.

On the other hand, in the hydrogen desorption course, the diffusion of the hydrogen atoms into the surfaces of the Mg crystal grains is promoted due to the presence of the highly active areas, and the very small grains promote the production of hydrogen molecules by bonding of the hydrogen atoms and the desorption of the hydrogen molecules from the surfaces of the Mg crystal grains. In this manner, the dehydrogenating speed is increased.

The metallographic structure with the very small grains having the average grain size $\underline{d}$ equal to or smaller than 20 nm being dispersed within each of the Mg crystal grains is a nano-sized composite structure and hence, the structural stability of the hydride $MgH_2$ is inhibited. Namely, in this alloy, the thermodynamic characteristic for $MgH_2$ is improved, and a drop in temperature of hydrogen dissociation thereof is achieved.

The content of Ni is set as described above in order to ensure that the Mg—Ni based alloy has a function as a hydrogen absorbing alloy. If the content of Ni is smaller than 2.1% by weight, such function is declined. On the other hand, if the content of Ni larger than 47.2% by weight, the entire matrix is formed mainly of $Mg_2Ni$ and for this reason, the nano-sized composite structure cannot be produced.

If the content of the alloy element AE is smaller than 0.1% by weight, the amount of very small grains produced is insufficient. On the other hand, if AE>16.3% by weight, the coalescence of the very small grains is brought about and for this reason, the hydrogen absorption/desorption characteristic of the powder is degraded. The content of the alloy element AE is preferably equal to or smaller than 5.5% by weight.

It is a yet further object of the present invention to provide a hydrogen absorbing alloy powder having a high hydrogenating speed and a high dehydrogenating speed without being subjected to an activating treatment, and having improved thermodynamic characteristic and durability.

To achieve the above object, according to the present invention, there is provided a hydrogen absorbing alloy powder comprising an amount of AE in a range of 0.1% by weight$\leq$AE$\leq$20% by weight and the balance of Mg, the AE being at least one alloy element selected from the group consisting of Ti, V, Mn and Fe, an average grain size D of Mg crystal grains constituting a matrix being equal to or smaller than 500 nm (D$\leq$500 nm), and a plurality of very small grains having an average grain size $\underline{d}$ equal to or smaller than 20 nm being dispersed in each of the Mg crystal grains and grain boundaries. The term "the grain size of Mg crystal grains" means a length of the longest portions of the Mg crystal grains in a photomicrographic structure diagram (or a photomicrograph showing a metallographic structure), and the average value of the lengths is the average grain size D of the Mg crystal grains. The term "grain size d of the very small grains" likewise means a length of the longest portions of the very small grains.

The metallographic structure, in which the plurality of very small grains having the average grain size $\underline{d}$ equal to or smaller than 20 nm are dispersed in each of the Mg crystal grains having the average grain size D equal to or smaller than 500 nm and in each of grain boundaries, is a nano-sized composite structure. Such structure is formed by adding the particular amount of the AE powder comprising the alloy element AE to the Mg powder, and subjecting the resulting powder mixture to the mechanical alloying in a hydrogen atmosphere and then to a dehydrogenating thermal treatment in vacuum or in a hydrogen atmosphere. The very small grains exist stably and cannot be coalesced in hydrogen-absorbing and desorbing courses at about 300° C. and hence, the coalescence of the Mg crystal grains is also inhibited. Namely, the nano-sized composite structure lasts over a long period.

In such nano-sized composite structure, the very small grains have an effect of promoting the adsorption of hydrogen molecules to surfaces of the Mg crystal grains and the dissociation of the adsorbed hydrogen molecules to hydrogen atoms in the hydrogen-absorbing course. Due to a difference between distances between atom faces generated between Mg atoms and the very small grains within each of the Mg crystal grains, an elastic strain field is produced in an interface area of the very small grains, and is an energetically high and highly active area. A plurality of such highly active areas exist in the Mg crystal grains and hence, an inactive Mg phase is activated, whereby the diffusion of hydrogen atoms into the Mg crystal grains is promoted. In this manner, the hydrogenating speed is increased. In addition, because the content of Mg is larger than 80% by weight, the hydrogen storage capacity is increased to approximately 6% by weight or more.

On the other hand, in the hydrogen desorption course, the diffusion of hydrogen atoms to the surfaces of the Mg crystal grains is promoted due to the presence of the highly active areas, and the very small grains promote the production of hydrogen molecules by bonding of hydrogen atoms and the desorption of the hydrogen molecules from the surface of the Mg crystal grains. In this manner, the dehydrogenating speed is increased.

The hydrogenating speed and the dehydrogenating speed which are excellent as described above are maintained over a long period with the lasting of the nano-sized composite structure and hence, the hydrogen absorbing alloy has an excellent durability.

In the nano-sized composite structure, the structural stability of the hydride $MgH_2$ is inhibited. Namely, the thermodynamic characteristic for the $MgH_2$ is improved, and a reduction in temperature of hydrogen-dissociation thereof is achieved.

However, if the content of the alloy element AE is smaller than 0.1% by weight, the amount of very small grains produced is insufficient. On the other hand, if AE>20% by weight, the volume fraction (Vf) of the matrix is decreased and hence, a high hydrogen storage capacity as described above cannot be obtained.

It is a yet further object of the present invention to provide a producing process of the above-described type, wherein a hydrogen absorbing alloy powder having a high hydrogenating speed and a high hydrogen storage capacity and moreover having such a characteristic that a dehydrogenating speed is high, can be produced without being subjected to an activating treatment, and the thermodynamic characteristic and the durability of the hydrogen absorbing alloy powder can be improved.

To achieve the above object, according to the present invention, there is provided a process for producing a hydrogen absorbing alloy powder, comprising the steps of weighing an AE powder comprising at least alloy element AE selected from the group consisting of Ti, V, Mn, Fe and Ni, and an Mg powder to provide an alloy composition comprising an amount of AE in a range of 0.1% by weight$\leq$AE$\leq$20% by weight and the balance of Mg, and throwing the AE powder and the Mg powder into a ball mill, where they are subjected to a mechanical alloying in a hydrogen atmosphere and then to a dehydrogenating thermal treatment either in vacuum or in a hydrogen atmosphere, thereby providing a hydrogen absorbing alloy powder which includes a plurality of Mg crystal grains constituting a matrix and having an average grain size D equal to or smaller than 500 nm, and a plurality of very small grains having an average grain size $\underline{d}$ equal to or smaller than 20 nm and dispersed in each of the Mg crystal grains and in each of grain boundaries. The term "grains size of Mg crystal grains" means a length of the longest portions of the Mg crystal grains in a photomicrographic structure diagram (or a photomicrograph showing a metallographic structure), and the average value of the lengths is the average grain size D of the Mg crystal grains. The term "grain size d of the very small grains" likewise means a length of the longest portions of the very small grains.

Thus, the hydrogen absorbing alloy powder having the metallographic structure, namely, having the nano-sized composite structure, with a plurality of the very small grains having the average grain size $\underline{d}$ equal to or smaller than 20 nm being dispersed in each of the Mg crystal grains having the average grain size D equal to or smaller than 500 nm and in each of grain boundaries can be easily produced by conducting the mechanical alloying in the hydrogen atmosphere and then the dehydrogenating thermal treatment either in vacuum or in the hydrogen atmosphere, as described above.

BEST MODE FOR CARRYING OUT THE INVENTION

EMBODIMENT I

Figure 1:
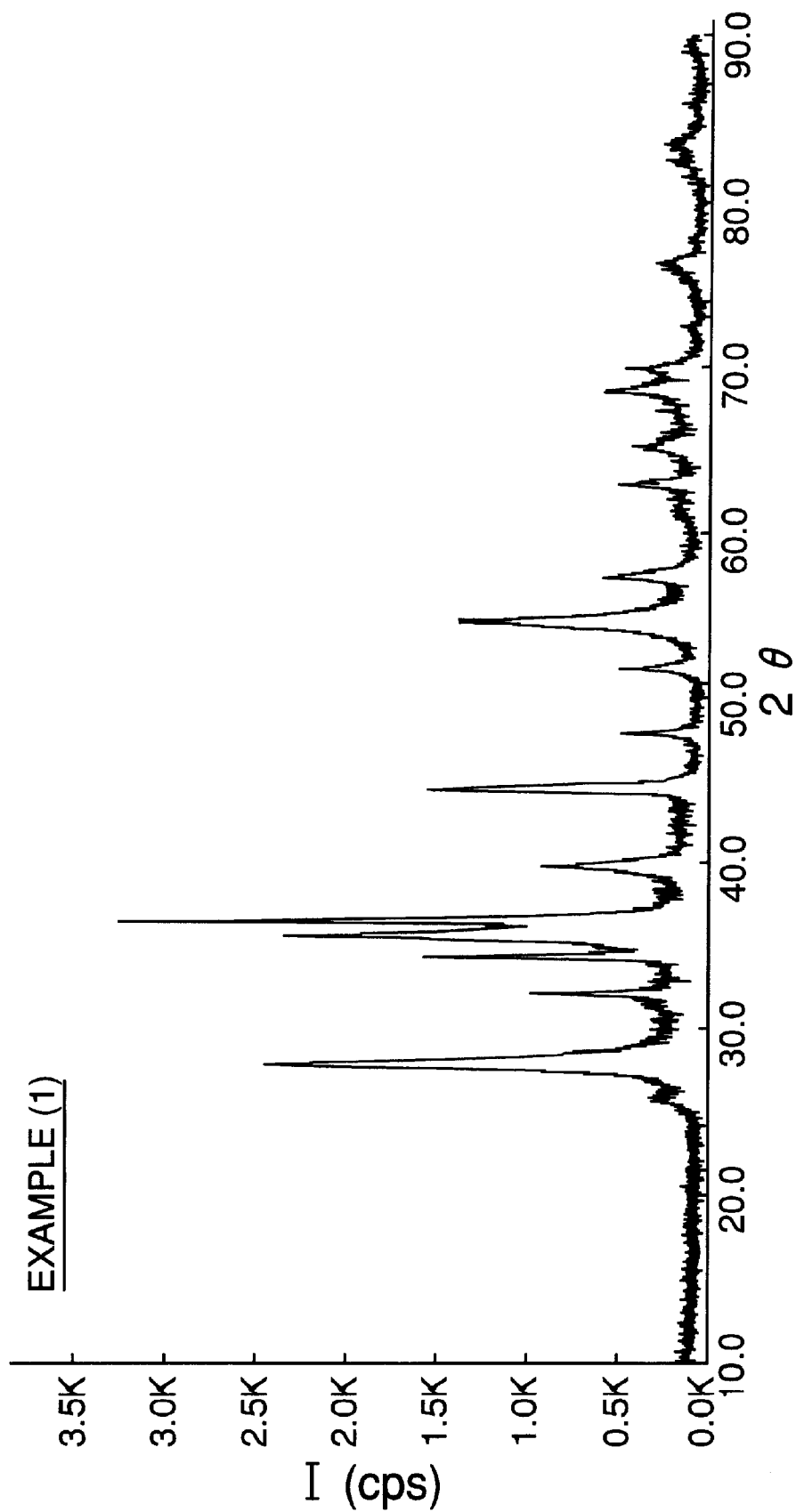
FIG. 1 is an X-ray diffraction diagram of example (1)

To produce a hydrogen absorbing alloy powder, a starting powder is thrown into a ball mill and then subjected to a mechanical alloying in a hydrogen atmosphere.

In this process, a hydrogen absorbing alloy powder having a hydrogenation rate A equal to or higher than 50% (A≧50%) is produced. The hydrogenation rate A is represented as A=(B/C)×100(%), wherein B represents a hydrogen storage capacity (% by weight) in the hydrogen absorbing alloy powder resulting from the mechanical alloying, and C represents a hydrogen storage capacity (% by weight) in the hydrogen absorbing alloy powder at the time when all hydrogenatable metal elements in the hydrogen absorbing alloy powder have been hydrogenated. The hydrogen absorbing alloy powder having the hydrogenation rate A equal to or higher than 50% as described above is stable in the atmospheric air and hence, can be handled in the atmospheric air. In this case, if non-hydrogenated particles are exposed to the atmospheric air, they are heated by the oxidation, but in the hydrogen absorbing alloy powder having the hydrogenation rate A as described above, the adverse influence to the PCT characteristic due to the heating is avoided.

In the mechanical alloying, the rotational speed of the ball mill is controlled to generate an acceleration 5 times or more and 20 times or less the acceleration of gravity within a container. This ensures that the starting powder can be subjected to a sufficient pulverization and pressure-bonding treatment for alloying, and the metallographic structure of the resulting alloy can be finely divided into an nm-size. Hydrogen creating the atmosphere also contributes to such fine division. However, if the acceleration is smaller than 5 times the acceleration of gravity, the hydrogenation does not advance sufficiently. On the other hand, if the acceleration exceeds 20 times the acceleration of gravity, particles of the alloy powder are agglomerated together and for this reason, a good powder state cannot be maintained, and the hydrogenation does not advance.

The hydrogen absorbing alloy powder resulting from the mechanical alloying is subjected to a dehydrogenating thermal treatment at a temperature $t$ set in a range of 80° C.$\leq t \leq$450° C. and for a time $h$ set in a range of 0.5 hr$\leq t \leq$10 hr. It is preferable that the atmosphere at this time be vacuum or a hydrogen atmosphere. The dehydrogenating thermal treatment contributes to the activation of the hydrogen absorbing alloy powder as described above. However, when conditions regarding the atmosphere, the temperature and the time are not satisfied, the high-degree activation of the metal hydrate power cannot be expected.

To carry out the activation of the hydrogen absorbing alloy powder quickly by the dehydrogenating thermal treatment, it is preferable that the hydrogenation rate A of the hydrogen absorbing alloy powder resulting from the mechanical alloying be equal to or higher than 50% (A$\geq$50%).

Further, an average grain size D of metal crystal grains constituting a matrix also contributes to the activation of the hydrogen absorbing alloy powder by the dehydrogenating treatment. To achieve the activation sufficiently, the average grain size D is in a range of 100 nm$\leq$D$\leq$500 nm, preferably, in a range of 100 nm$\leq$D$\leq$300 nm. Namely, it is desirable that nano-sized textures appear in the powder. It is required that the nano-sized textures appear as a result of the mechanical alloying and also exist after the dehydrogenating treatment. The term "grain size of the metal crystal grains" means a length of the longest portions of the metal crystal grains in a photomicrographic structure diagram (or a photomicrograph showing a metallographic structure).

It is also desirable that the particle size $d_0$ of the hydrogen absorbing alloy powder after the dehydrogenating treatment be in a range of 0.1 $\mu$m$\leq d_0 \leq$200 $\mu$m. If the particle size $d_0$ is smaller than 0.1 $\mu$m, the alloy powder reacts with oxygen and water extremely easily and hence, it is difficult to handle the alloy powder in the atmospheric air. On the other hand, if $d_0$>200 $\mu$m, the relative surface area of the powder is reduced, resulting in reduced hydrogen-absorbing/desorbing speeds.

An Mg-alloy powder corresponds to such a type of a hydrogen absorbing alloy powder. The Mg-alloy powder has a composition comprising AE in a range of 0.1% by weight$\leq$AE$\leq$20% by weight and the balance of Mg, wherein AE is at least one alloy element selected from the group consisting of Ti, V, Mn, Fe, Ni, Cu and Al. However, if the content of the alloy element AE is lower than 0.1% by weight, the amount of very small grains produced, present in Mg crystal grains or grain boundaries, is insufficient and hence, an excellent hydrogen-desorbing characteristic cannot be obtained. On the other hand, if AE>20% by weight, Vf (the volume fraction) of the matrix is reduced and hence, a hydrogen storage capacity equal to or higher than 6% by weight cannot be obtained.

Particular examples will be described below.

[I] Production of Hydrogen Absorbing Alloy by Mechanical Alloying

An Mg powder, an Ni powder and an Fe powder each having a purity of 99% and a particle size smaller than 200 $\mu$m (75 meshes) were weighed, so that a composition of a hydrogen absorbing alloy comprises $Mg_{93.2}Ni_{4.6}Fe_{2.2}$ (the unit of numerical values is % by weight), and they were mixed to provide 2.5 grams of a powder mixture. The powder mixture was placed into a container (made of JIS SUS316) having a volume of 80 ml in a planetary ball mill (P-5 made by Furitsch) along with eighteen balls (made of JIS SUS316) having a diameter of 10 mm, and the container was evacuated until the inside thereof reached $10^{-3}$ Torr. After the evacuation, the inside of the container was pressurized by hydrogen to 1 MPa, and the powder mixture was subjected to a mechanical alloying under conditions of a container-rotational speed of 780 rpm, a disk-rotational speed of 360 rpm and a treating time of 9 hours. During the mechanical alloying, an acceleration 9 times the acceleration of gravity was generated in the container. After the mechanical alloying, 2.3 grams of a hydrogen absorbing alloy powder was collected in the atmospheric air. This powder has a particle size equal to or smaller than 30 $\mu$m. This powder is called example (1).

[II] Consideration Regarding Example (1)

Figure 2:
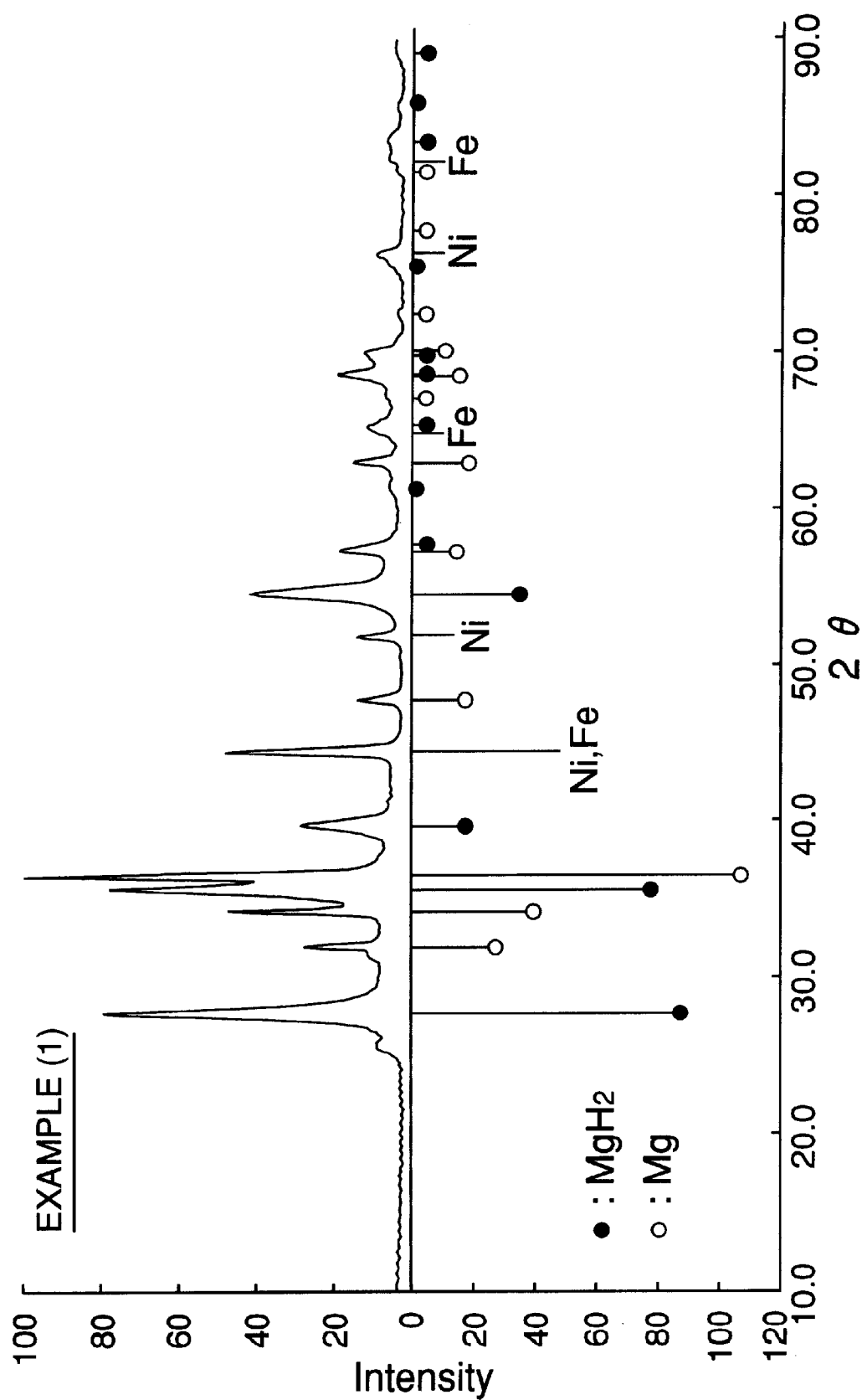
FIG. 2 is a diagram of collation with FIG. 1.

(a) The qualitative analysis of example (1) was carried out by an X-rays diffraction process, thereby providing results shown in FIG. 1. FIG. 2 is a diagram of collation with FIG. 1. From FIG. 2, the presence of Mg, Ni and Fe in example (1) was confirmed, and the production of $MgH_2$, which was a metal hydride, was recognized.

Figure 3:
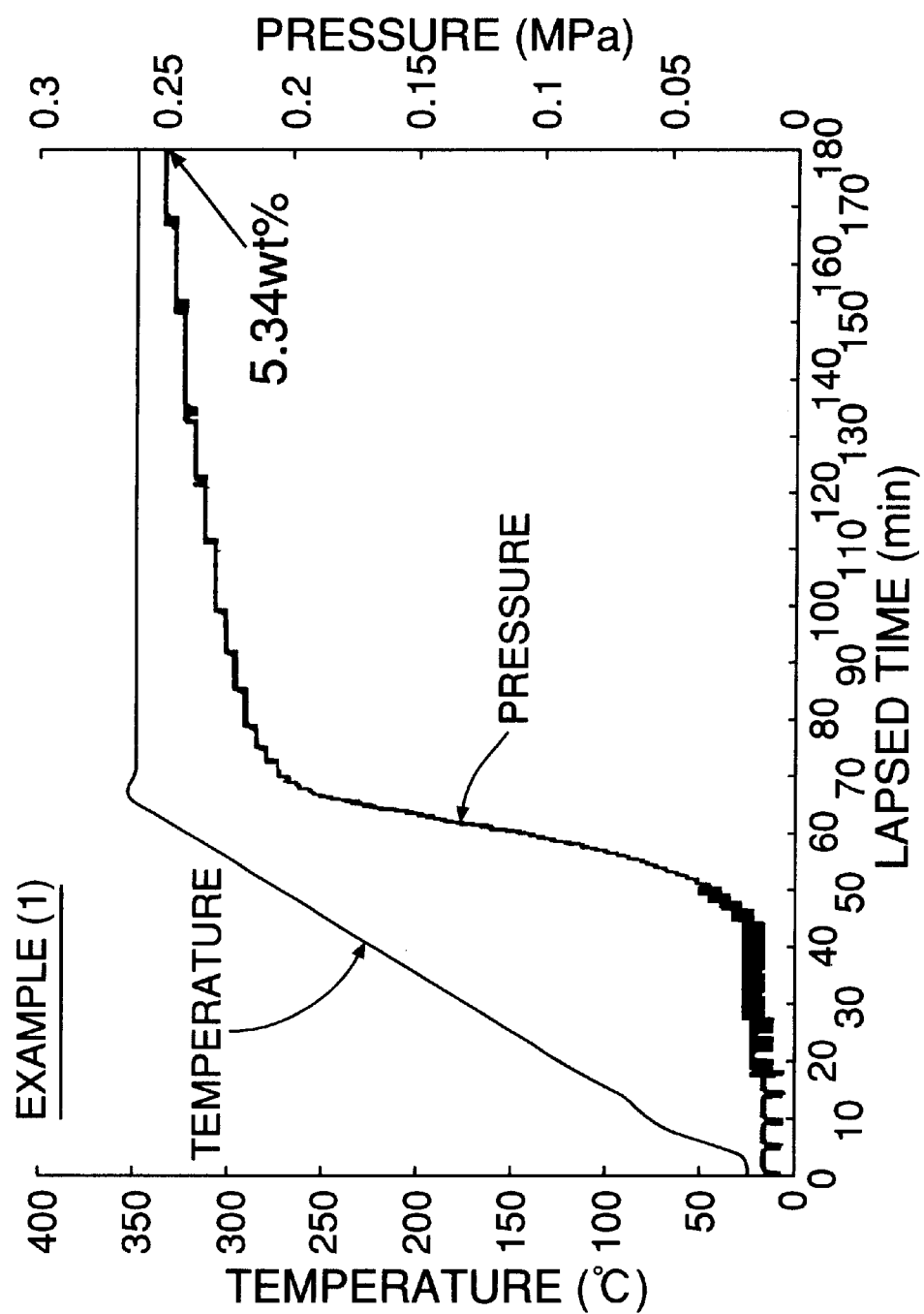
FIG. 3 is a graph showing the relationship between the lapsed time and the temperature as well as the pressure in the measurement of a hydrogen storage capacity in example (1)

(b) A hydrogen storage capacity in example (1) was measured using a PCT apparatus (see JISH7201) and as a result, it was ascertained that the hydrogen storage capacity B in example (1) was nearly equal to 5.34% by weight (B$\approx$5.34% by weight, as shown in FIG. 3. A hydrogen storage capacity C, when all Mg elements in example (1) were hydrogenated, was nearly equal to 7.08% by weight (C$\approx$7.08% by weight) and hence, the hydrogenation rate A in example (1) was nearly equal to 75% (A$\approx$75%).

If non-hydrogenated particles are exposed to the atmospheric air, they are heated by the oxidation, but in the hydrogen absorbing alloy powder having the hydrogenation rate A equal to or higher than 50% as described above, the adverse influence to the PCT characteristic due to the heating is avoided.

(c) Example (1) was subjected to a dehydrogenating thermal treatment under conditions of 350° C. and 2 hours in vacuum (of $10^{-3}$ Torr). It was ascertained that the particle size $d_0$ of the powder in example (1) was equal to or smaller than 20 $\mu$m ($d_0 \leq$20 $\mu$m), and the average grain size D of Mg crystal grains constituting the matrix was equal to 330 nm.

Figure 4:
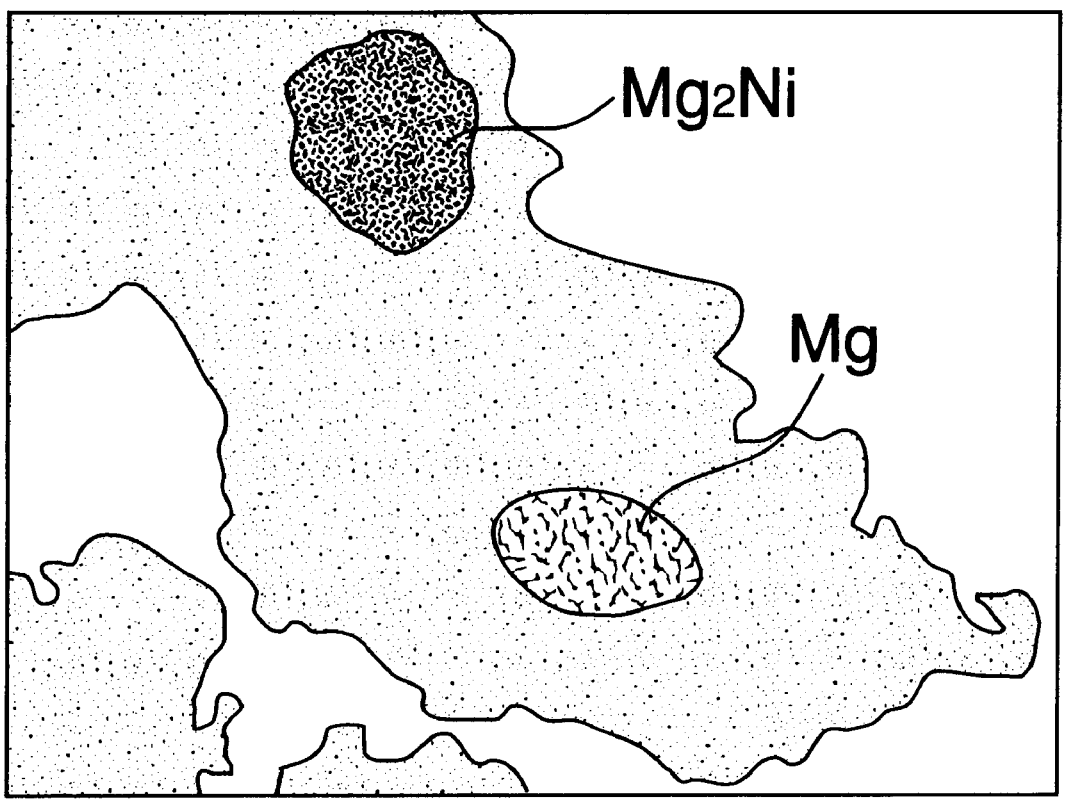
FIG. 4 is a photomicrographic structure diagram of example (1)

FIG. 4 is a diagram of a photomicrographic structure in example (1). It can be seen from FIG. 4 that the grain size D of the Mg crystal grains is nearly equal to 357 nm. In addition, a large number of very small grains having an average grain size equal to or smaller than 20 nm were present in each of the Mg crystal grains.

(d) For comparison, example (01) of a hydrogen absorbing alloy powder was produced under the same conditions as in example (1), except that the hydrogen atmosphere in the mechanical alloying was changed to an argon atmosphere.

However, example (01) was not hydrogenated irrespective of a particle size $d_0 \leq$45 $\mu$m. Therefore, if example (01) is exposed to the atmospheric air during collection, it adsorbed oxygen in the atmospheric air to cause an exothermic reaction, and some of the particles were fired. Such example (01) cannot be used as a hydrogen absorbing alloy powder.

Therefore, example (02) of a hydrogen absorbing alloy powder as a comparative example was produced by carrying out the collection after the ball milling within a globe box. Of course, a hydride $MgH_2$ was not contained in example (02).

Example (02) was subjected to the following activating treatment. This treatment was carried out by the following procedure: The heating was conducted at 350° C. for 5 hours after evacuation, and the hydrogen-pressurization was conducted to 1 MPa for 10 hours, and the heating and the hydrogen-pressurization as one cycle were repeated 10 cycles. The heating in the second and subsequent cycles was intended for the dehydrogenation.

Figure 5:
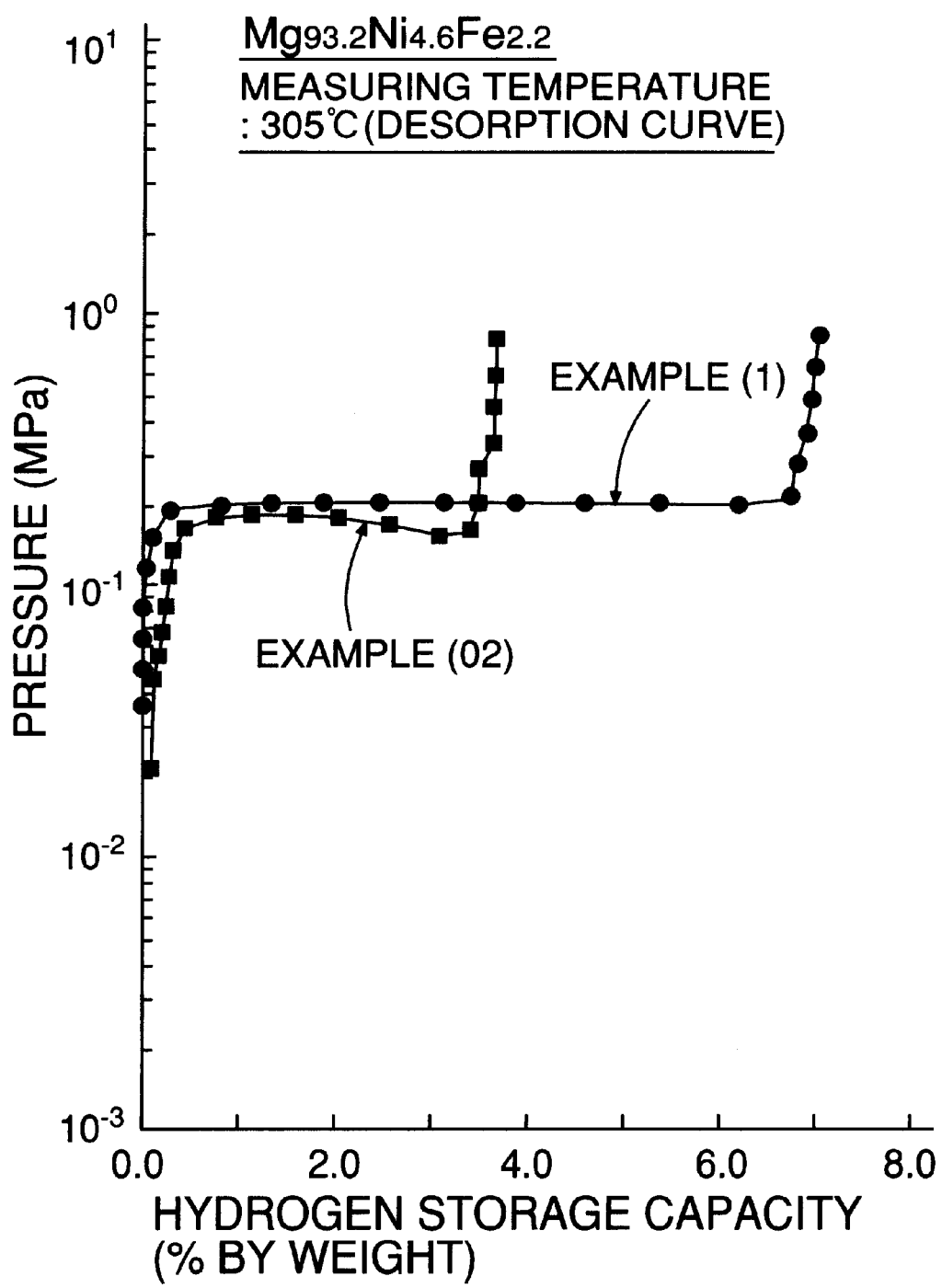
FIG. 5 is a diagram showing PCT curves for examples (1) and (02)

(e) Each of the examples (1) and (02) were subjected to a hydrogen-desorbing test at 305° C. according to a vacuum origin process defined in a pressure-composition isotherm (a PCT curve) volumetric measuring process (JISH7201), thereby providing results shown in FIG. 5. As can be seen from FIG. 5, example (1) has an excellent PCT characteristic and a high hydrogen storage capacity equal to 7% by weight under the hydrogen-pressurization up to 1 MPa.

Example (02) is significantly inferior in PCT characteristic to example (1), notwithstanding that it was subjected to the activating treatment for a long period of time as described above. This is considered to be due to that the pressure of pressurizing hydrogen is set in a range of 4 to 6 MPa in a common activating treatment, but was set at 1 MPa in the above-described activating treatment and hence, sufficient activation was not conducted.

It can be seen from the results shown in FIG. 5 that example (1) can be charged into a tank and subjected to the dehydrogenating thermal treatment and can be used under a pressure of pressurizing hydrogen equal to or lower than 1 MPa. If the pressure of pressurizing hydrogen is equal to or lower than 1 MPa, there is provided an advantage that the degree of freedom of design of the tank for charging is increased. A plateau region is very flat and hence, an amount of hydrogen equal to approximately 7% by weight can be absorbed and desorbed in a hydrogen pressure range of 0.1 to 1 MPa.

On the contrast, in example (02), a pressure of pressurizing hydrogen in a range of 4 to 6 MPa is required. For this reason, the tank is of a high-pressure accommodation type and thus, the shape of the tank, the thickness of a material forming the tank and the like are restricted largely and correspondingly, the weight is also increased very largely. If the activation is carried out in advance in another vessel of a high-pressure accommodation type, example (02) is in an activated state and hence, cannot be charged into the tank in the atmospheric air. If the hydrogen-pressurized atmosphere in the tank is taken into consideration, it is necessary to weld a lid to a tank body. Therefore, it is conceived that all of powder charging and welding operations are carried out in an inert atmosphere, but this is not realistic. Moreover, it is considered that if the amount of example (2) is a level of tens of kilograms, the above-described operations are difficult remarkably.

According to EMBODIMENT I, the activation can be achieved completely easily even for a difficultly-activated powder having a high concentration of Mg, e.g., Mg alloy powder, by a combination of the mechanical alloying in the hydrogen atmosphere and the dehydrogenating thermal treatment, thereby producing a hydrogen absorbing alloy powder capable of being handled in the atmospheric air.

EMBODIMENT II

To produce a hydrogen absorbing alloy powder, a starting powder is thrown into a container of a ball mill, and hydrogen is then charged into the container to conduct the mechanical alloying. At an intermediate stage of the mechanical alloying, hydrogen is charged again into the container.

In this process, a hydrogen absorbing alloy powder having a hydrogenation rate A equal to or higher than 50% ($A \geq 50\%$) is produced. A method for determining the hydrogenation rate A is as described in EMBODIMENT I.

The hydrogen absorbing alloy powder having a hydrogenation rate A equal to or higher than 50% as described above is stable in the atmospheric air and hence, can be handled in the atmospheric air. In this case, if non-hydrogenated particles are exposed to the atmospheric air, they are heated by the oxidation, but in the hydrogen absorbing alloy powder having the hydrogenation rate A as described above, the adverse influence to the PCT characteristic due to the heating is avoided.

The hydrogen absorbing alloy powder resulting from the mechanical alloying is subjected to a dehydrogenating thermal treatment at a temperature $t$ set in a range of 80° C.$\leq t \leq$450° C. and for a time $h$ set in a range of 0.5 hr$\leq h \leq$10 hr in the hydrogen atmosphere. The dehydrogenating thermal treatment contributes to the activation of the hydrogen absorbing alloy powder as described above. However, when conditions regarding the temperature and the time are not satisfied, the high-degree activation of the metal hydrate power cannot be expected.

The metal hydride in the hydrogen absorbing alloy powder produced by the above-described process exists in an unstable state (in a state near a solid solution phase), as compared with the hydride in example (1) in EMBODIMENT I. Therefore, even if a vacuum state is provided, the metal hydride can desorb hydrogen easily by heating in a hydrogen atmosphere equal to or lower than a given pressure. The pressure of the hydrogen atmosphere is determined by a heating temperature condition. Of course, a dehydrogenating thermal treatment in vacuum is also possible.

To carry out the activation of the hydrogen absorbing alloy powder quickly by the dehydrogenating thermal treatment, it is preferable that the hydrogenation rate A of the hydrogen absorbing alloy powder resulting from the mechanical alloying be equal to or higher than 50% ($A \geq 50\%$).

Further, an average grain size D of metal crystal grains constituting a matrix contributes to the activation of the hydrogen absorbing alloy powder by the dehydrogenating thermal treatment. To achieve the activation sufficiently, the average grain size D is in a range of 100 nm$\leq D \leq$500 nm, preferably, in a range of 100 nm$\leq D \leq$300 nm. Namely, it is desirable that nano-sized textures appear in the powder. It is required that the nano-sized textures appear as a result of the mechanical alloying and also exist after the dehydrogenating treatment. The definition of the grain size of the metal crystal grains is the same as in EMBODIMENT I.

It is preferable that a volume change rate F of the hydrogen absorbing alloy powder due to the desorption (absorption) of hydrogen be equal to or lower than 17.5% ($F \leq 17.5\%$).

The hydrogen absorbed in the hydrogen absorbing alloy powder resulting from the mechanical alloying includes hydrogen existing in crystal grains and forming a stable metal hydride, and hydrogen existing in a solid solution state in a grain boundary area. When hydrogen is desorbed, it is considered that the unstable latter hydrogen existing in the grain boundary area is first desorbed at a low temperature, and the hydrogen existing in the grains is then desorbed.

Therefore, the volume change rate F of this hydrogen absorbing alloy powder is smaller than that F of a hydrogen absorbing alloy powder having only hydrogen forming a stable metal hydride. If the volume change rate F is equal to or lower than 17.5%, the desorption of hydrogen at the low temperature is caused by the presence of hydrogen in the grain boundary area. Therefore, it is easier to carry out the dehydrogenating thermal treatment, and the evacuation using a vacuum pump is not required.

After the dehydrogenating thermal treatment, it is desirable that the particle size $d_0$ of the hydrogen absorbing alloy powder be in a range of $0.1\ \mu m \leq d_0 \leq 200\ \mu m$. If the particle size $d_0$ is smaller than $0.1\ \mu m$, the hydrogen absorbing alloy powder reacts with oxygen and water extremely easily and for this reason, it is difficult to handle the hydrogen absorbing alloy powder in the atmospheric air. On the other hand, if $d_0 > 200\ \mu m$, the relative surface area of the powder is reduced, resulting in reduced hydrogen-absorbing/desorbing speeds.

An Mg-alloy powder corresponds to such a type of a hydrogen absorbing alloy powder. The Mg-alloy powder has a composition comprising AE in a range of 0.26% by weight $\leq AE \leq 12\%$ by weight and the balance of Mg, wherein AE is at least one alloy element selected from the group consisting of Ti, V, Mn, Fe, Ni, Cu and Al. However, if the content of the alloy element AE is lower than 0.26% by weight, the hydrogenation does not advance sufficiently even if the mechanical alloying is carried out in a hydrogen atmosphere and for this reason, a hydrogenation rate A equal to or higher than 50% cannot be obtained. On the other hand, if $AE > 12\%$ by weight, Vf (the volume fraction) of the matrix is reduced and for this reason, a high hydrogen storage capcity equal to or higher than 6.6% by weight cannot be obtained.

Particular examples will be described below.

[I] Production of Hydrogen Absorbing Alloy by Mechanical Alloying

An Mg powder, an Ni powder and an Fe powder each having a purity of 99% and a particle size smaller than 200 $\mu m$ (75 meshes) were weighed, so that a hydrogen absorbing alloy composition comprises $Mg_{95.4}Ni_{3.5}Fe_{1.1}$ (the unit of numerical values is % by weight), and they were mixed to provide 3 grams of a powder mixture. The powder mixture was placed into a container (made of JIS SUS316) having a volume of 80 ml in a planetary ball mill (P-5 made by Furitsch) along with eighteen balls (made of JIS SUS316) having a diameter of 10 mm, and the container was evacuated until the inside thereof reached $10^{-2}$ Torr. After the evacuation, hydrogen was charged into the container to pressurize the inside of the container to 1 MPa, and the powder mixture was subjected to a mechanical alloying under conditions of a container-rotational speed of 780 rpm, a disk-rotational speed of 360 rpm and a treating time of 10 hours. During the mechanical alloying, hydrogen was absorbed in the powder and as a result, the amount of hydrogen was reduced. Therefore, hydrogen was charged again into the container after lapse of 7 hours from the start of the mechanical alloying to pressurize the inside of the container to 1 MPa. The pressure of hydrogen in the container at the time of finish of the mechanical alloying was reduced to about 0.1 MPa due to the absorption of hydrogen in the powder. After the mechanical alloying, 2.8 grams of a hydrogen absorbing alloy powder was collected in the atmospheric air. This powder has a particle size equal to or smaller than 35 $\mu m$. This powder is called example (2).

For comparison, a hydrogen absorbing alloy powder was produced under the same conditions as in example (2), except that the hydrogen atmosphere in the mechanical alloying was changed to an argon atmosphere, and the collection of the hydrogen absorbing alloy powder was conducted in a globe box. The hydrogen absorbing alloy powder was subjected to two activating treatments. One of the activating treatments was carried out by the following procedure: The heating was conducted at 350° C. for 5 hours after evacuation, and the hydrogen-pressurization was conducted to 1 MPa for 10 hours, and the heating and the hydrogen-pressurization as one cycle were repeated 10 cycles. The hydrogen absorbing alloy powder produced in a hydrogenated state through this treatment is called example (03). The other treatment was carried out by the following procedure: The heating was conducted at 370° C. for 5 hours after evacuation, and the hydrogen-pressurization was conducted to 5 MPa for 10 hours, and the heating and the hydrogen-pressurization as one cycle were repeated 10 cycles. The hydrogen absorbing alloy powder produced in a hydrogenated state through this treatment is called example (04). The heating in the second and subsequent cycles in each of the treatments was intended for the dehydrogenation.

[II] Consideration Regarding Example (2)

(a) The qualitative analysis of example (2) was carried out by an X-rays diffraction process. The result showed that the presence of Mg, Ni and Fe was confirmed, and the production of $MgH_2$, which was a metal hydride, was recognized, as in the example (1) in EMBODIMENT I.

Figure 6:
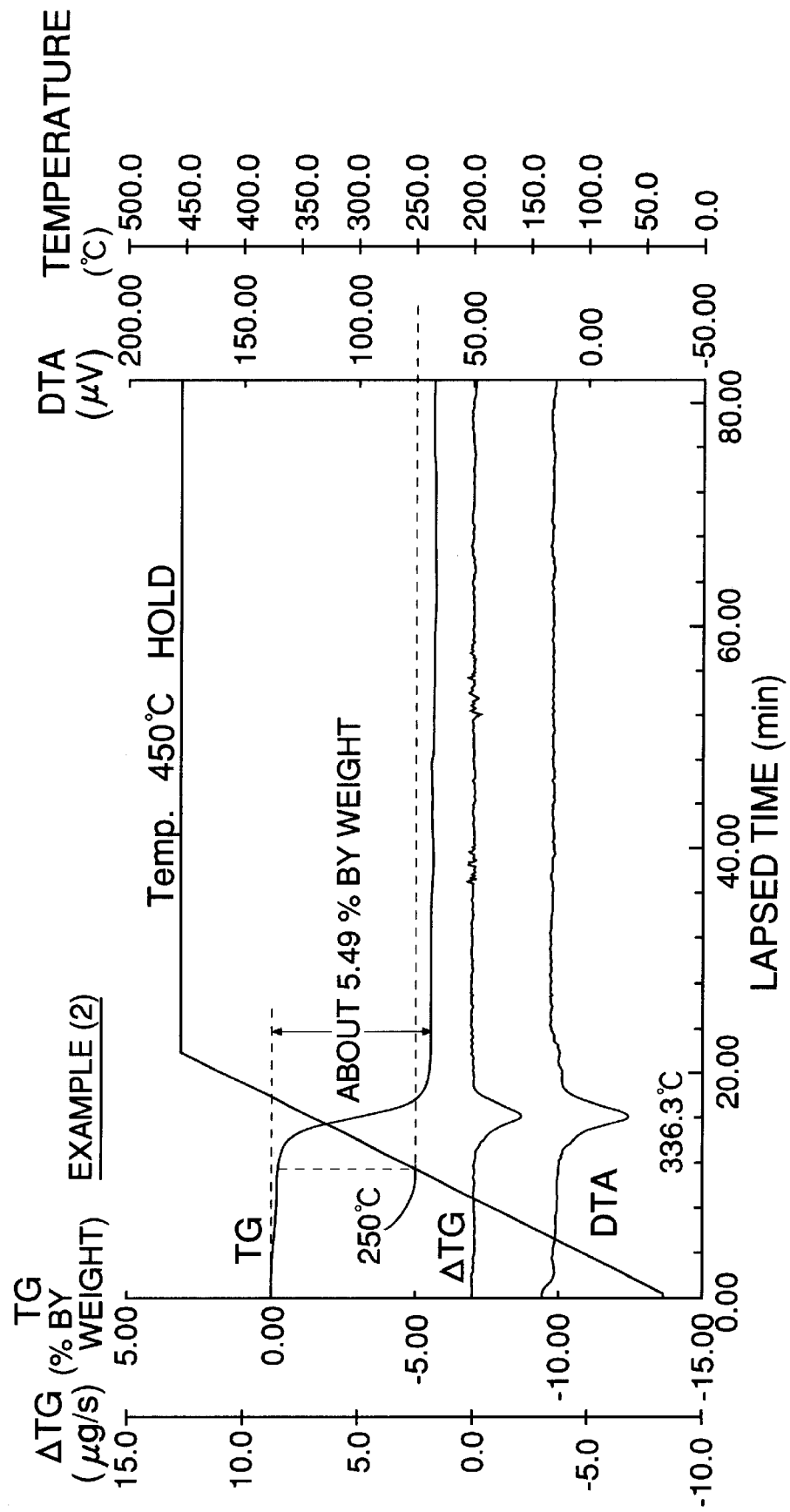
FIG. 6 is a graph showing results of TG-DTA for example (2)
Figure 7:
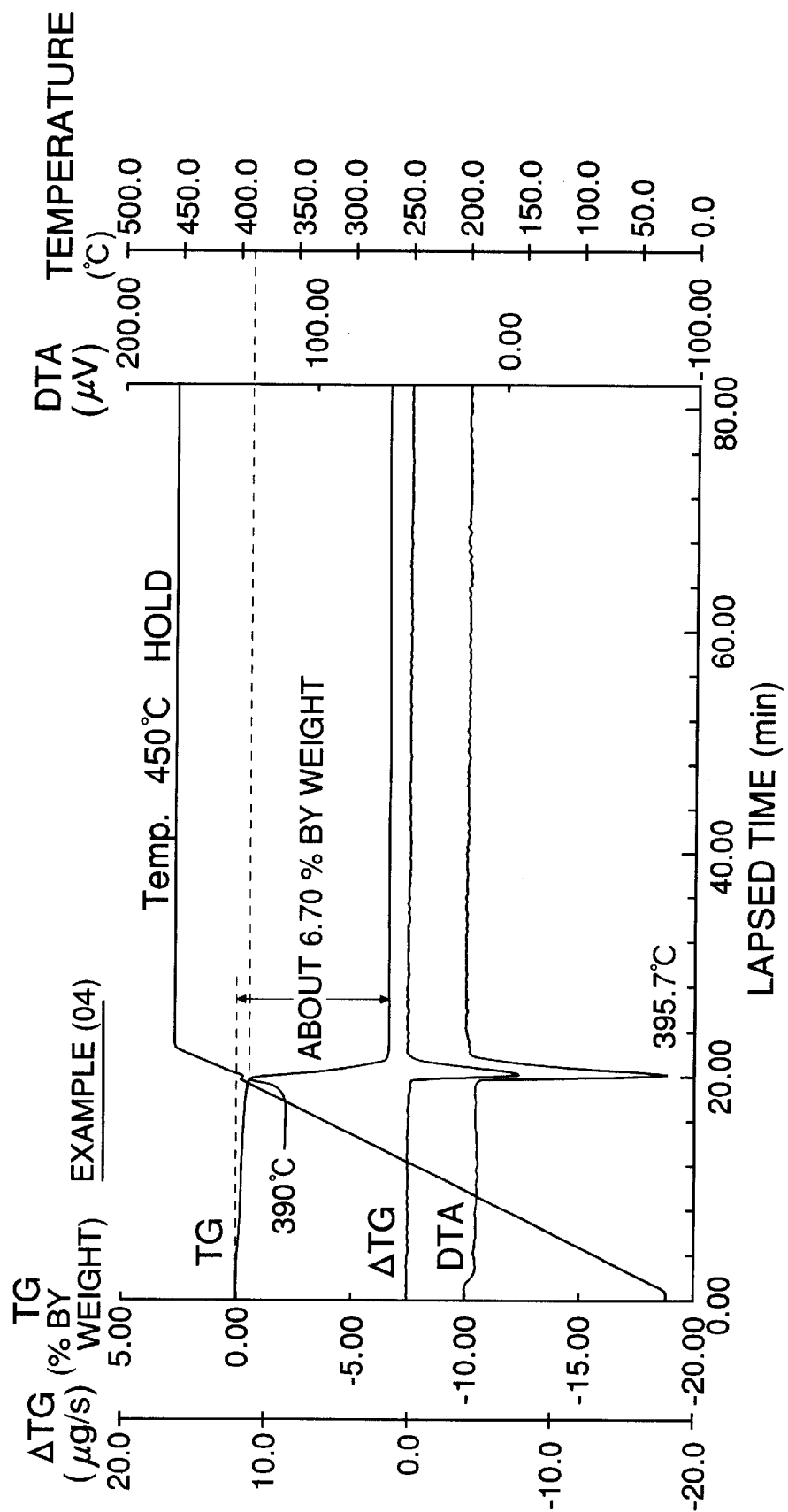
FIG. 7 is a graph showing results of TG-DTA for example (04)

(b) Example (2) resulting from the mechanical alloying and example (04) resulting from the activating treatment were subjected to TG-DTA (a differential thermal gravimetric analysis), and a temperature at the start of hydrogen desorption and a decrement in weight of the powder caused by the hydrogen desorption, namely, a hydrogen storage capacity were measured, thereby providing results shown in FIGS. 6 and 7.

In the case of example (2) shown in FIG. 6, it was ascertained that the hydrogen desorption was started at about 250° C. at a temperature rise speed of 20° C./min, namely, a temperature at the start of hydrogen desorption in example (2) was 250° C., and a hydrogen storage capacity B was nearly equal to 5.49% by weight ($B \approx 5.49\%$ by weight) in terms of a decrement in weight of the powder. A hydrogen storage capacity C at the time when all Mg elements in the example (2) were hydrogenated was nearly equal to 7.25% by weight and hence, a hydrogenation rate A of example (2) was nearly equal to 76%.

In the case of example (04) shown in FIG. 7, it was ascertained that the hydrogen desorption was started at about 390° C. at a temperature rise speed of 20° C./min, namely, a temperature at the start of hydrogen desorption in example (04) was 390° C., and a hydrogen storage capacity was about 6.70% by weight in terms of a decrement in weight of the powder. The larger hydrogen storage capacity as described above is attributable to the activating treatment at the higher temperature and under the higher pressure for the longer time.

The most remarkable difference between examples (2) and (04) resides in the temperature at the start of hydrogen desorption. The temperature at the start of hydrogen desorption in example (2) is 140° C. lower than that in example (04). It can be seen from this point that the magnesium (Mg) hydride in example (2) is in an unstable state, as compared with that in example (04).

Figure 8:
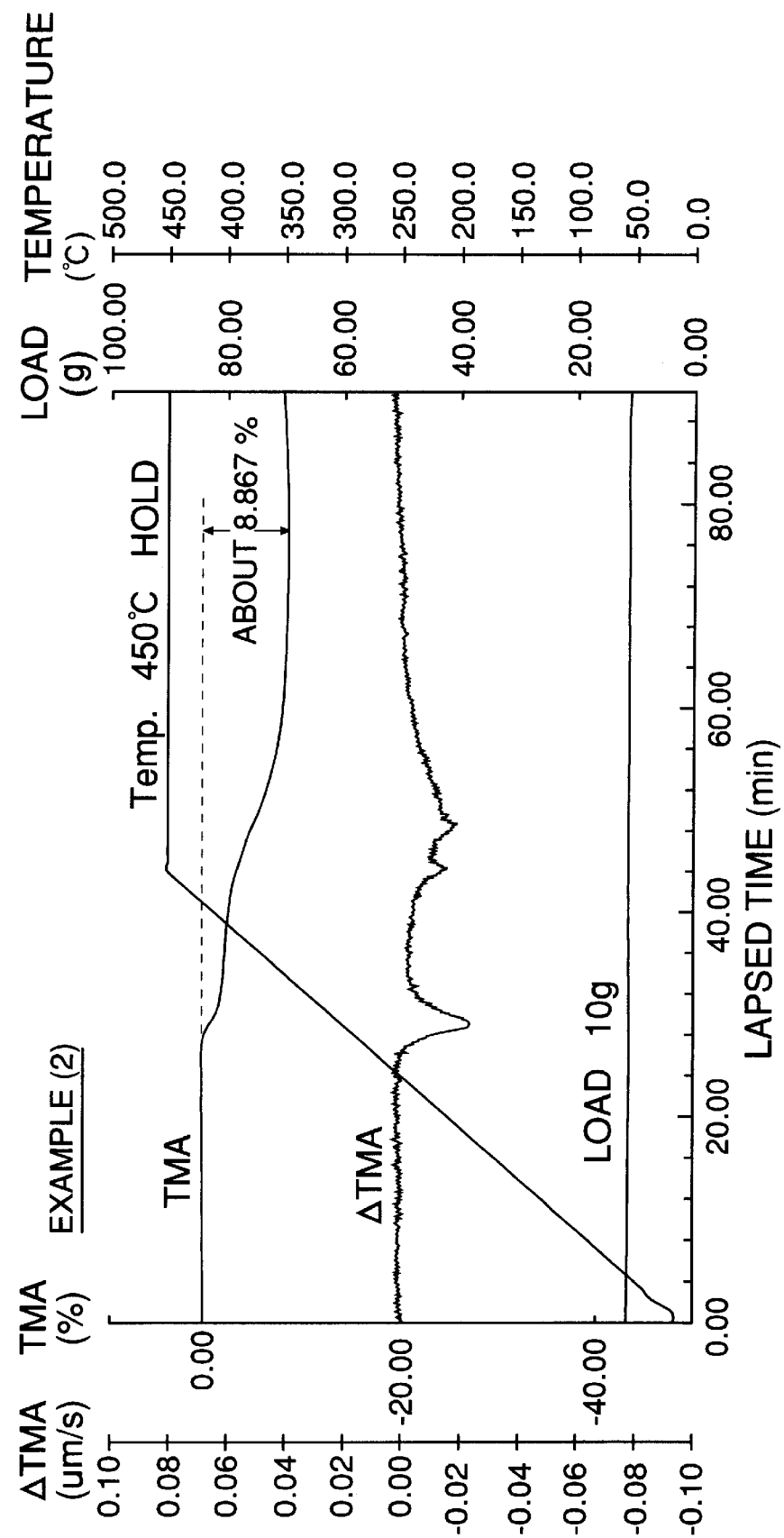
FIG. 8 is a graph showing results of TMA for example (2)
Figure 9:
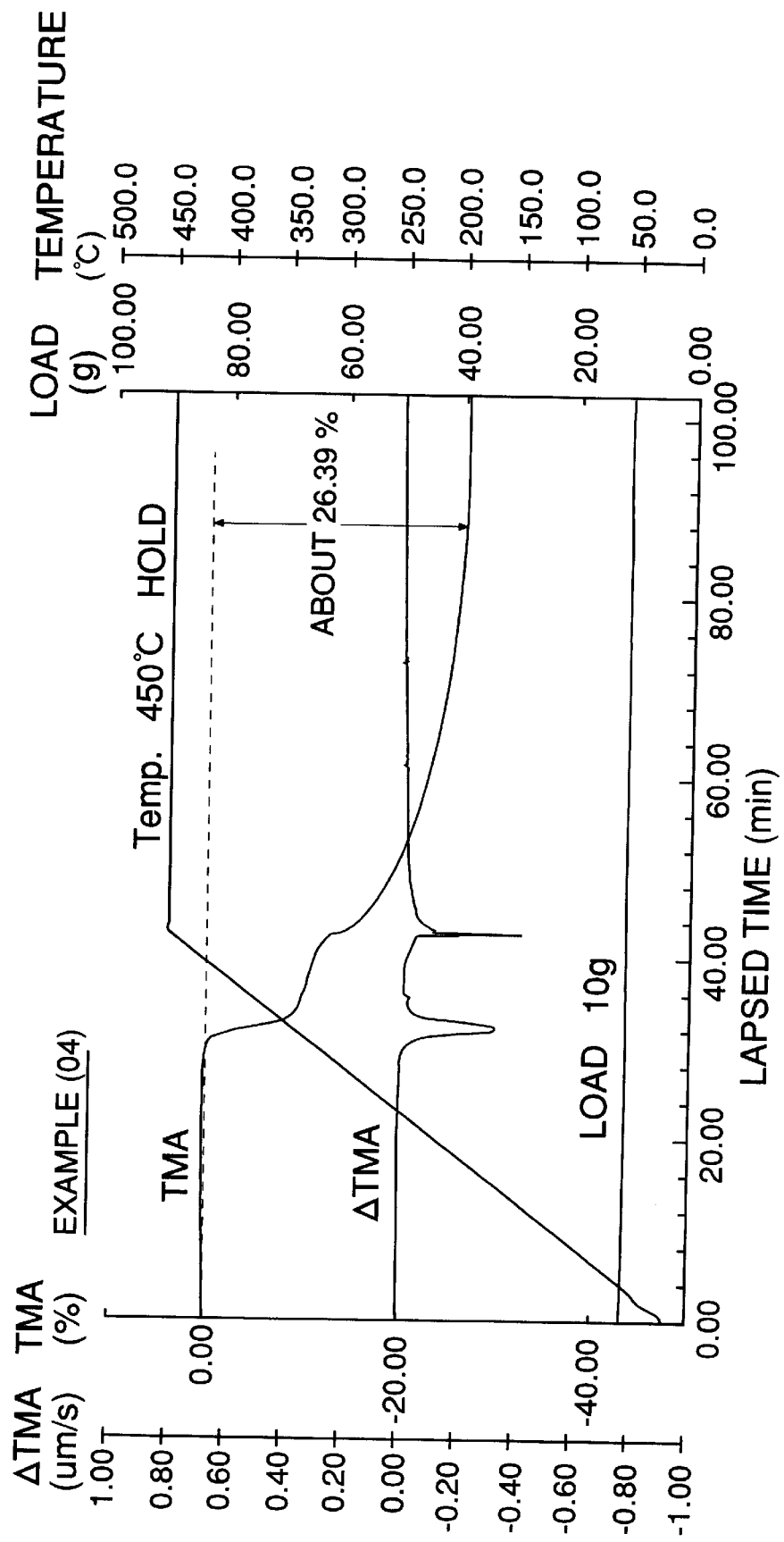
FIG. 9 is a graph showing results of TMA for example (04)

(c) Example (2) resulting from the mechanical alloying and example (04) resulting from the activating treatment were subjected to TMA (a differential expansion analysis), and a volume change rate F of each of examples (2) and (04) due to the hydrogen desorption was measured, thereby providing results shown in FIGS. 8 and 9.

It can be seen from FIG. 8 that the volume change rate F of example (2) is nearly equal to 8.867%, and from FIG. 9 that the volume change rate F of example (04) is nearly equal to 26.39%.

A hydrogen storage capacity in example (2) is 5.49% by weight, and a hydrogen storage capacity in example (04) is 6.70% by weight. Therefore, the ratio of the hydrogen storage capacity in the examples is $6.70/5.49 \approx 1.22$, and the ratio of the volume change rates is $26.39/8.867 \approx 2.98$. If the hydrogen-absorbed states of examples (2) and (04) are substantially identical to each other, the ratio of the volume change rates must be substantially equal to the ratio of the hydrogen storage capacity. However, the reason why both of the ratios are different largely from each other as described above is considered that example (2) has a hydrogen-absorbed state different from that of example (04), namely, includes hydrogen existing in the grain boundary area, as described above.

(d) To subject example (2) to a dehydrogenating thermal treatment, example (2) was heated to 350° C. to desorb hydrogen, and maintained in a heated state at 350° C., until the pressure of the hydrogen atmosphere reached 0.1 MPa. The treating time was 0.5 hour and during this time, 99% of the absorbed hydrogen was desorbed. It was ascertained that the particle size $d_0$ of example (2) was equal to or smaller than 30 μm, and the average grain size D of the Mg crystal grains constituting the matrix was equal to 300 nm. In addition, a large number of vary small grains having an average grain size of 20 nm or less existed in each of the Mg crystal grains.

Figure 10:
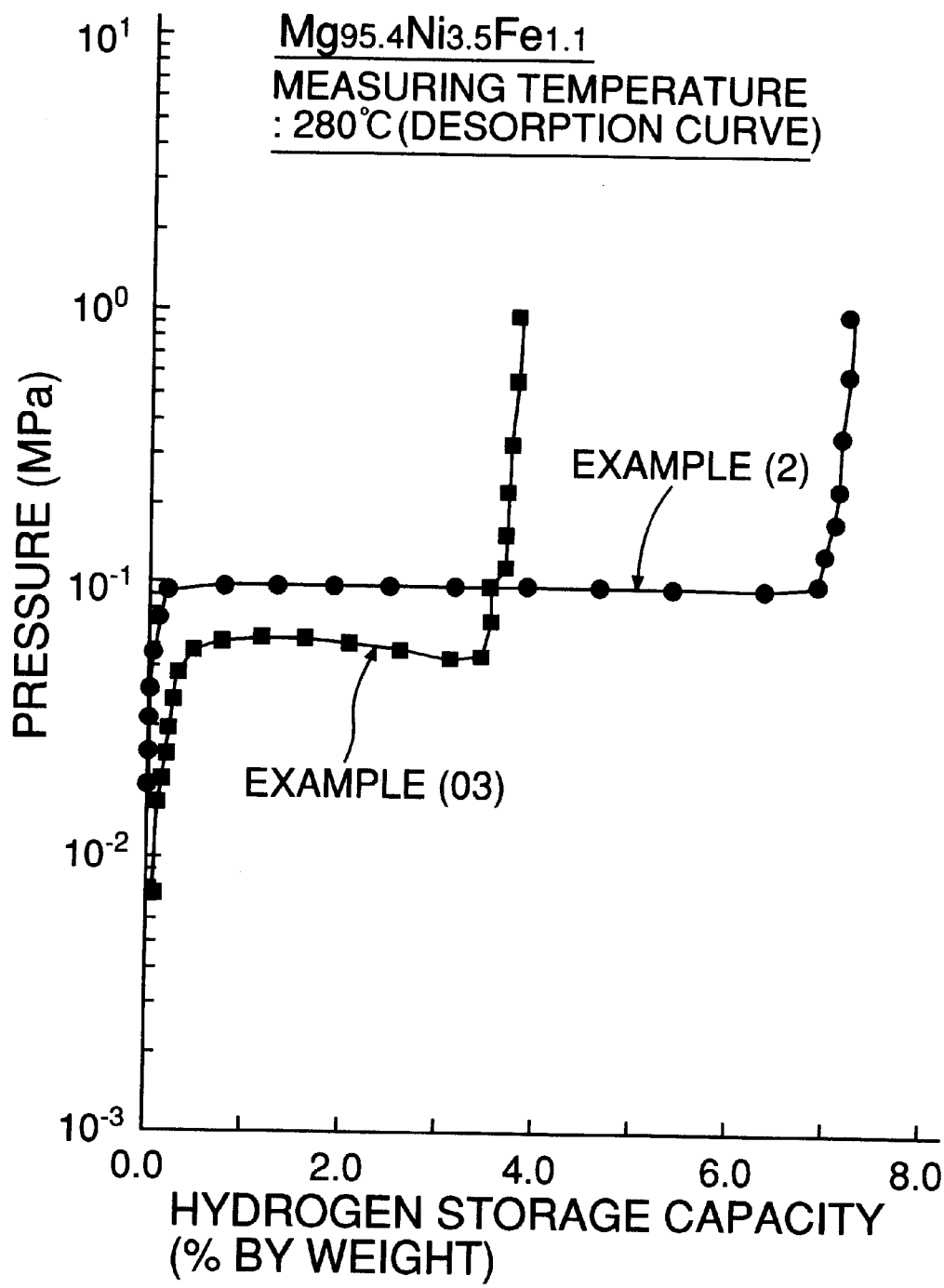
FIG. 10 is a diagram showing PCT curves for examples (2) and (03)

Then, the examples (2) and (03) were subjected to a hydrogen desorption test at 280° C. according to a vacuum origin process defined in a pressure-composition isotherm (a PCT curve) volumetric measuring process (JISH7201), thereby providing results shown in FIG. 10. As can be seen from FIG. 10, example (2) has an excellent PCT characteristic and a high hydrogen storage capacity equal to 7.15% by weight under the hydrogen-pressurization up to 1 MPa.

Example (03) is significantly inferior in PCT characteristic to example (2), notwithstanding that it was subjected to the activating treatment for a long period of time, as described above. This is considered to be due to that the sufficient activation was not conducted, because the pressure of pressurizing hydrogen in the activating treatment was set at 1 MPa, as described in EMBODIMENT I.

It can be seen from the results shown in FIG. 10 that the example (2) can be charged into a tank and subjected to the dehydrogenating thermal treatment without the evacuation and can be used under a pressure of pressurizing hydrogen equal to or lower than 1 MPa. If the pressure of pressurizing hydrogen is equal to or lower than 1 MPa, as described above, there is provided an advantage that the degree of freedom of design of the tank for charging is increased. A plateau region is very flat and hence, an amount of hydrogen equal to 7% by weight or more can be absorbed and desorbed in a hydrogen pressure range of 0.1 to 1 MPa. On the contrast, examples (03) and (04) have a disadvantage similar to that described with regard to example (02) in EMBODIMENT I.

Figure 11:
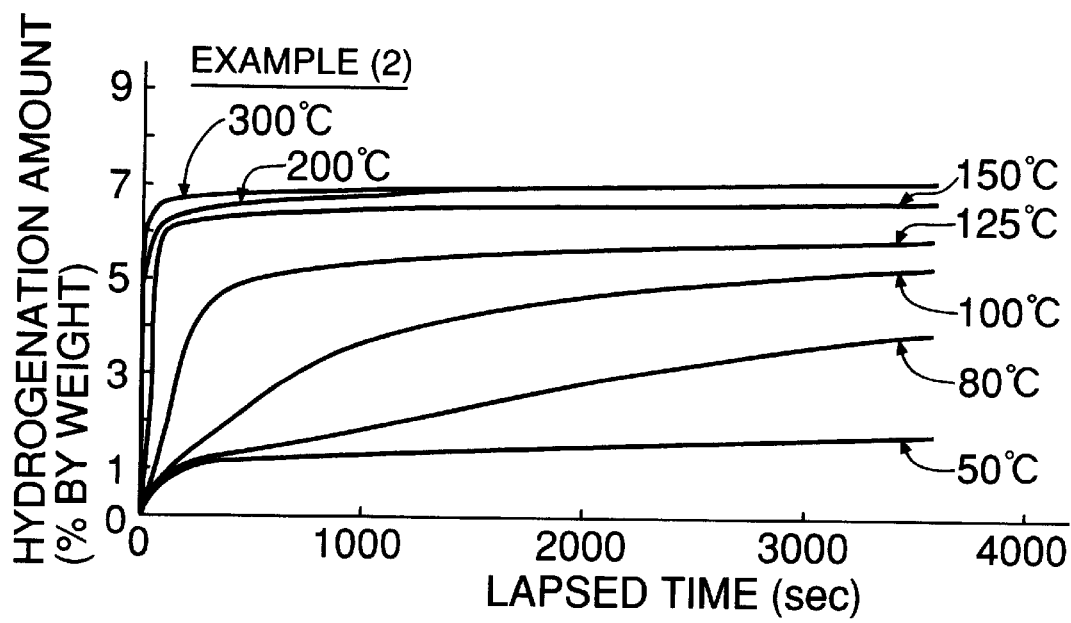
FIG. 11 is a graph showing a hydrogen-absorbing characteristic of example (2)

FIG. 11 shows that the hydrogen-absorbing speed for the example (2) depends on the temperature. Such data were obtained by maintaining the absorbing temperature at a predetermined level in a range of 50° C. to 300° C. and conducting the hydrogen-pressurization from a vacuum state to 1.0 MPa. It can be seen from FIG. 11 that example (2) absorbs hydrogen even at 50° C. and has an excellent hydrogen-absorbing speed at 150° or higher.

Figure 12:
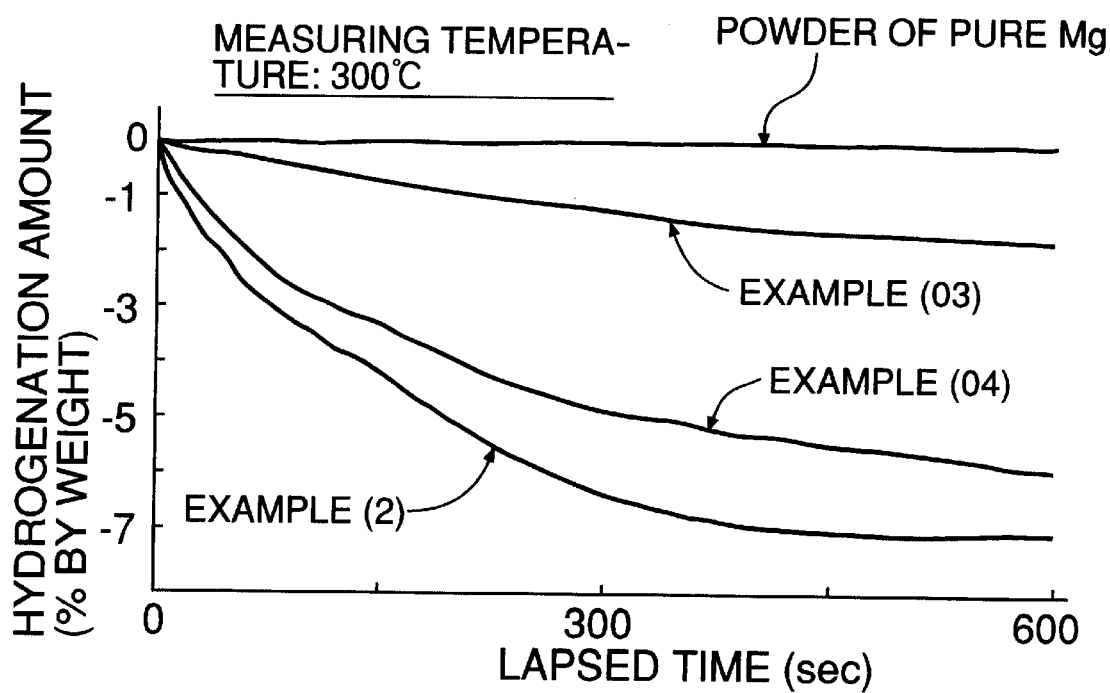
FIG. 12 is a graph showing a hydrogen-desorbing characteristic of each of examples (2), (03) and (04)

FIG. 12 shows hydrogen-desorbing speeds for examples (2), (03) and (04) and a powder of pure Mg produced through no ball-milling (a powder produced through the activating treatment and the hydrogenation). Such data were obtained at a desorbing temperature of 300° C. and under an initial hydrogen pressure of 0.03 MPa. It can be seen from FIG. 12 that example (2) has an excellent hydrogen-desorbing characteristic, as compared with the others.

Figure 13:
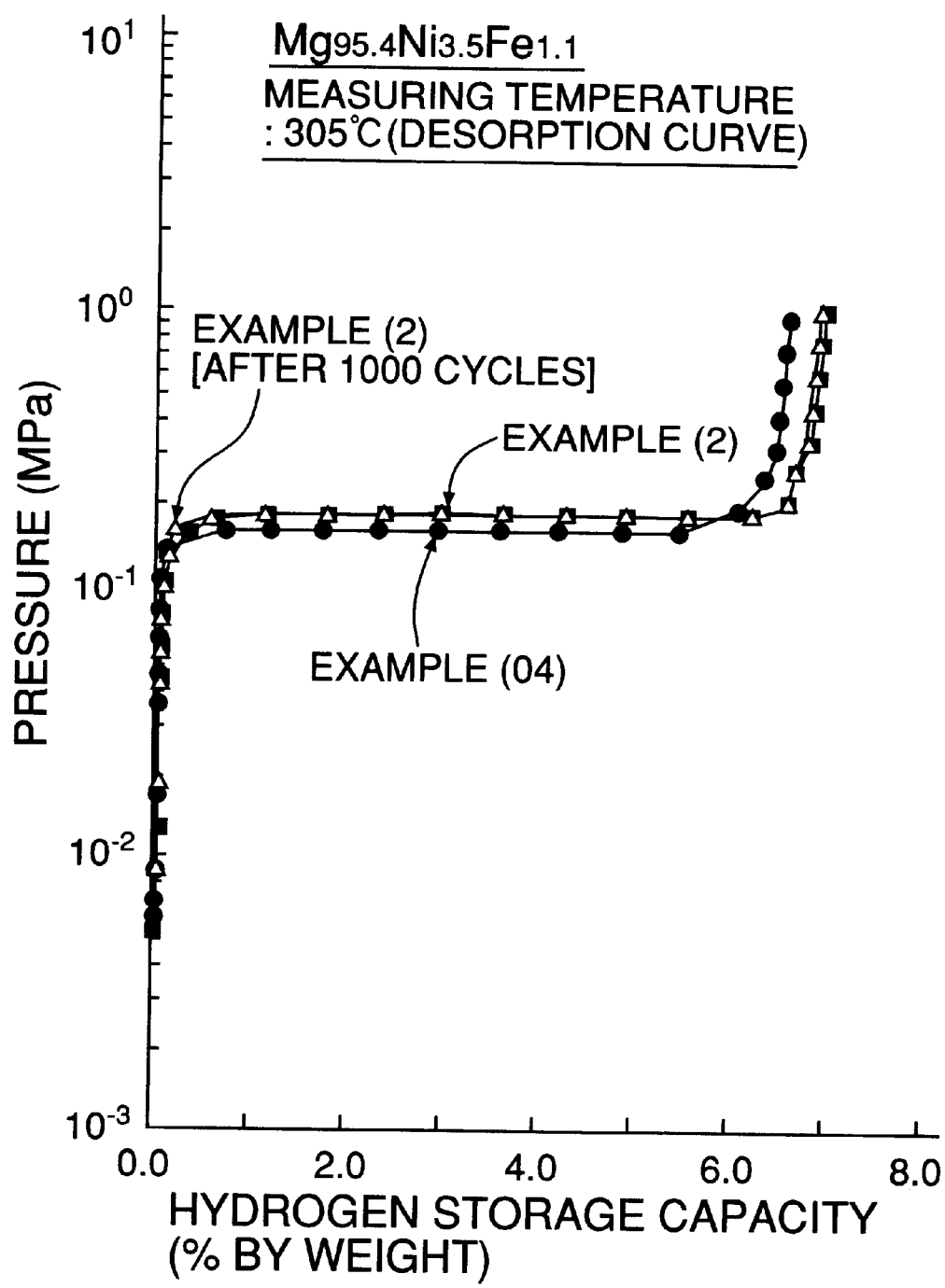
FIG. 13 is a diagram showing PCT curves for examples (2) and (04)

FIG. 13 shows results of the measurement of PCT characteristics for examples (2) and (04). Such data were obtained by conducting a hydrogen-desorbing test at 305° according to a measuring process (JISH7201) similar to that described above. It can be seen from FIG. 13 that example (2) shown by black square points has an excellent hydrogen storage capacity and an excellent equilibrium dissociation pressure, as compared with example (04) shown by black circles. White triangular points in FIG. 13 indicate the PCT characteristic of the example (2) produced by repeating the absorption and desorption of hydrogen as one cycle up to 1,000 cycles. It can be also seen from FIG. 13 that example (2) has the PCT characteristic substantially identical to that in an initial state even after the 1,000 cycles, and an excellent durability.

According to this EMBODIMENT II, it is possible to produce a hydrogen absorbing alloy powder (an effect hydrogen storage capacity: 6.6% by weight or more) having an excellent utility intended to store hydrogen to be supplied to a fuel cell and a hydrogen automobile. This hydrogen absorbing alloy powder does not require an activating treatment (highly hydrogen-pressurizing and evacuating treatments) within a tank, which is required in the prior art. Therefore, the hydrogen absorbing alloy powder can be charged in a tank after the mechanical alloying and mounted, as it is, on a vehicle and can be put into a usual use in a mounted state only by desorbing hydrogen once under a hydrogen pressure in a range of 0.1 to 1.0 MPa.

EMBODIMENT III

[A-1] Production of Hydrogen Absorbing Alloy Powder by Mechanical Alloying

An Mg powder, an Ni powder and an Fe powder each having a purity of 99.9% and a particle size smaller than 200 μm (75 meshes) were weighed to provide a hydrogen absorbing alloy composition comprising $Mg_{93.3}Ni_{2.3}Fe_{4.4}$ (the unit of numerical values is % by weight), and they were mixed to provide 3 grams of a powder mixture. The powder mixture was placed into a container (made of JIS SUS316) having a volume of 80 ml in a planetary ball mill (P-5 made by Furitsch) along with eighteen balls (made of JIS SUS316) having a diameter of 10 mm, and the container was evacuated until the inside thereof reached $10^{-3}$ Torr. After the evacuation, the inside of the container was pressurized by hydrogen to 1 MPa, and the powder mixture was subjected to a mechanical alloying under conditions of a container-rotational speed of 780 rpm, a disk-rotational speed of 360 rpm and a treating time of 8 hours. After the mechanical alloying, 2.3 grams of a hydrogen absorbing alloy powder was collected within a globe box. This powder had a particle size equal to or smaller than 40 μm. This powder is called example (3).

[A-2] Production of Hydrogen Absorbing Alloy Powder Using Casting Process

An Mg powder, an Ni powder and an Fe powder each having a purity of 99.9% were weighed to provide a hydrogen absorbing alloy composition comprising $Mg_{93.3}Ni_{2.3}Fe_{4.4}$ (the unit of numerical values is % by weight), and the weighed materials were molten by a high frequency and then subjected to a casting to produce an ingot. The ingot was subjected to the pulverization and classification within a globe box to produce a hydrogen absorbing alloy powder having a particle size smaller than 50 μm. Further, the powder was subjected to an activating treatment. In the activating treatment, the powder was placed into a vessel, and an inside of the vessel was evacuated at 350° C. to $10^{-4}$ Torr and then pressurized by hydrogen to 4 MPa. The evacuation and pressurization as one cycle were repeated 10 cycles. A hydrogen absorbing alloy powder produced in the above manner is called example (05).

[A-3] Observation of Metallographic Structure

Figure 14:
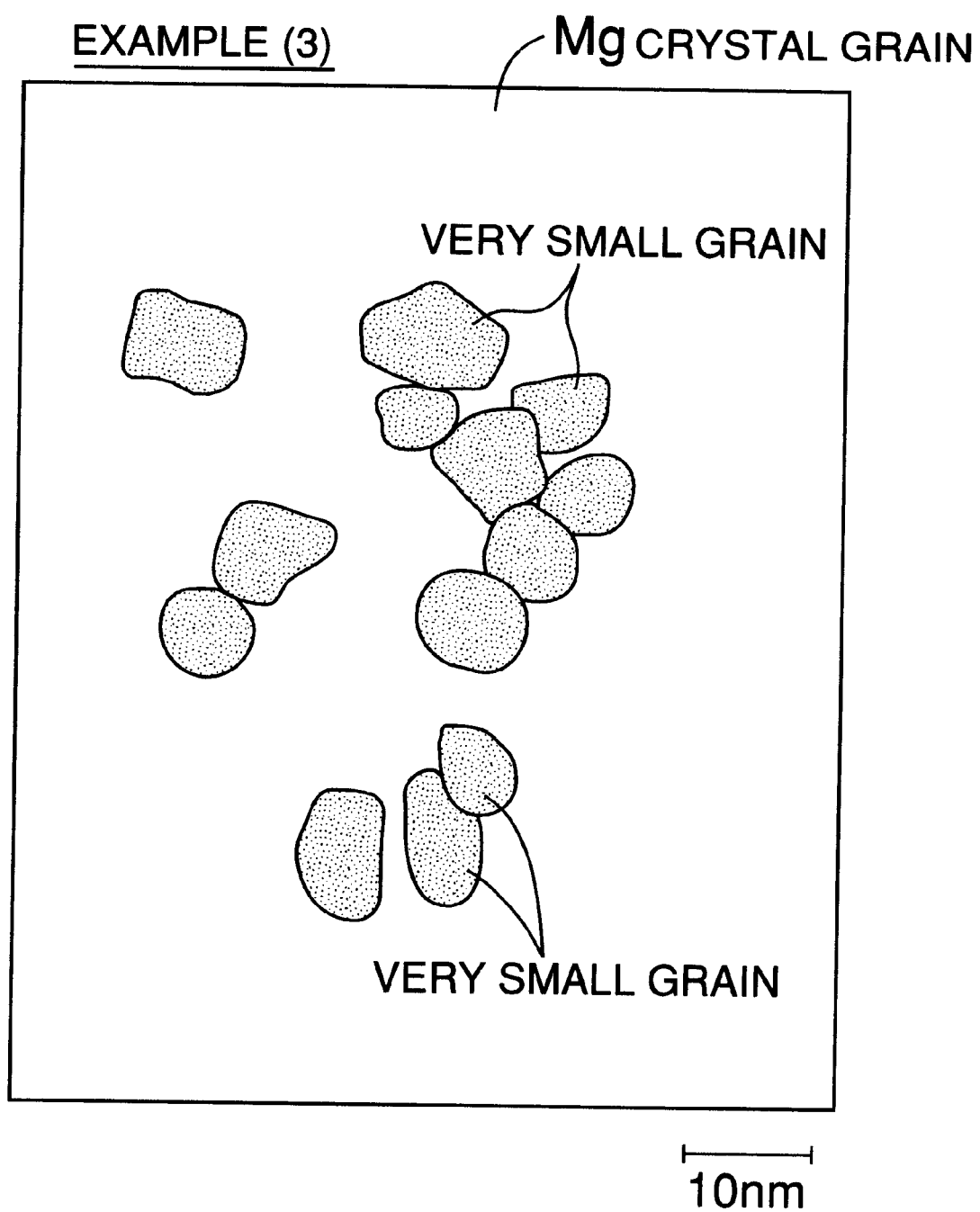
FIG. 14 is a photomicrographic structure diagram of example (3)

Example (3) was subjected to an observation of a metallographic structure using a transmission electronic microscope and an accessory EDX (energy dispersion-type X-ray diffraction). The result showed that the matrix was formed of a plurality of Mg crystal grains, and very small grains having an average grain size $\underline{d}$ equal to or smaller than 20 nm were dispersed in each of the Mg crystal grains (and a grain boundary area) as shown in the photomicrographic structure diagram of FIG. 14.

In example (05), the average grain size D of the Mg crystal grains constituting the matrix was equal to or smaller than 3 μm, and the presence of vary small grains was not observed in each of the Mg crystal grains, but the segregation of Fe was observed in the metallographic structure.

[A-4] Hydrogen-absorbing/desorbing Characteristic and PCT Curve

Examples (3) and (05) were subjected to a hydrogenating speed test and a dehydrogenating speed test at 300° C. according to a vacuum origin process defined in a pressure-composition isotherm (a PCT curve) volumetric measuring process (JISH7201). Example (3) was subjected to the tests after being subjected to a dehydrogenating thermal treatment at 350° C. for one hour in vacuum, because at least some of Mg phases were phases of $MgH_2$ for the reason that the mechanical alloying was conducted under a pressure of hydrogen in the producing course.

Figure 15:
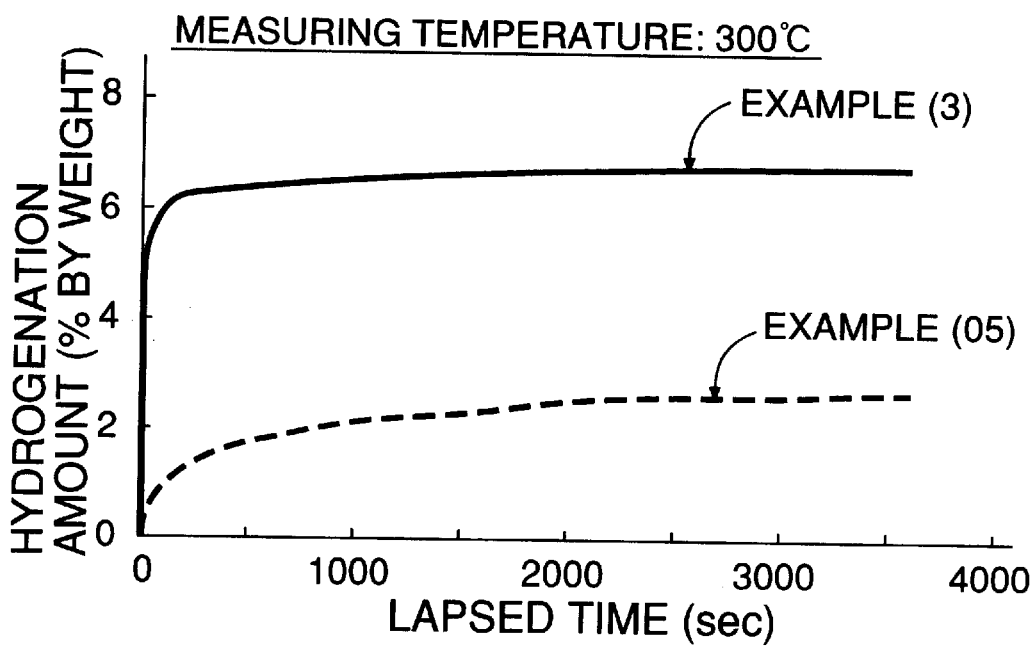
FIG. 15 is a graph showing the relationship between the lapsed time and the hydrogenated amount in a hydrogenating speed test for examples (3) and (05)

FIG. 15 shows results of the hydrogenating speed test at the measuring temperature of 300° C. In this test, a high hydrogen-pressurization was conducted from a vacuum state to 3.2 MPa. A large difference in hydrogenating speed was generated between examples (3) and (05), notwithstanding that they had the same composition ($Mg_{93.3}Ni_{2.3}Fe_{4.4}$). Example (3) has an excellent hydrogenation characteristic such that it absorbs 5% by weight or more of hydrogen for 60 seconds after the introduction of hydrogen. Example (3) finally has a high hydrogen storage capacity equal to or higher than 6.5% by weight.

Figure 16:
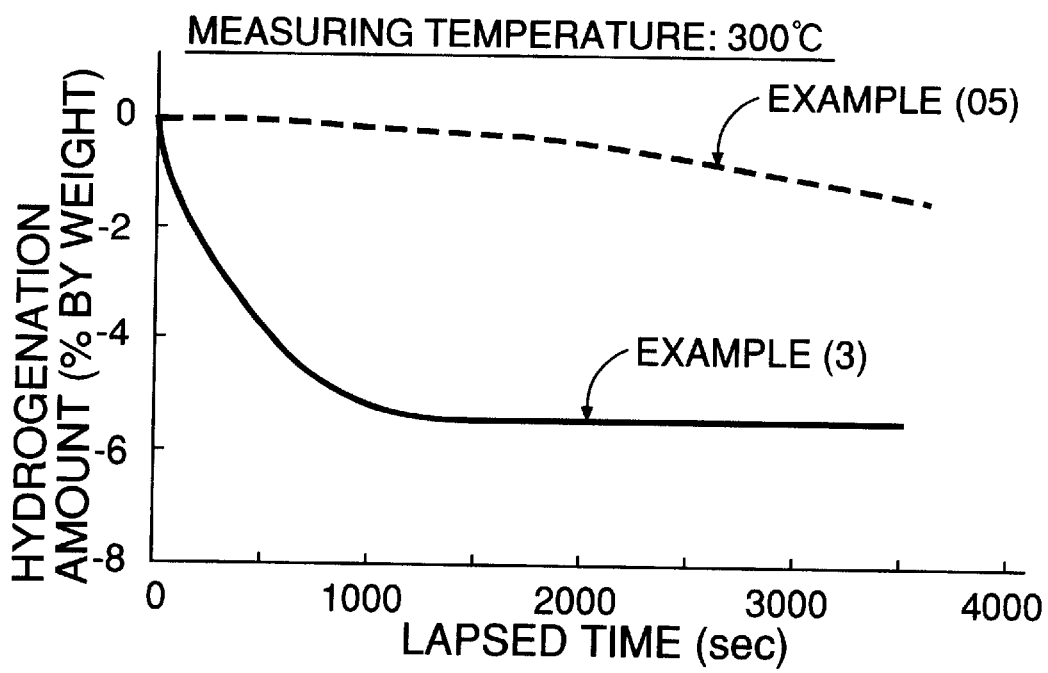
FIG. 16 is a graph showing the relationship between the lapsed time and the hydrogenated amount in a dehydrogenating speed test for examples (3) and (05)

FIG. 16 shows results of the dehydrogenating speed test at the measuring temperature of 300° C. In this case, a hydrogen pressure initially set was 0.03 MPa because of the restriction of plateau pressures at 300° C. for examples (3) and (05) and the specification of the apparatus. As apparent from FIG. 16, it can be seen that a falling gradient in a hydrogen desorption curve after starting of the hydrogen desorption is extremely steep in example (3), as compared with example (05) and hence, example (3) has an excellent dehydrogenating speed. The reason why the amount of hydrogen desorbed in example (3) is constant at 5.3% by weight is that the hydrogen pressure in the sample vessel was increased with the desorbing of hydrogen, and reached an equilibrium dissociation pressure when an amount of hydrogen equal to 5.3% by weight was desorbed.

Figure 17:
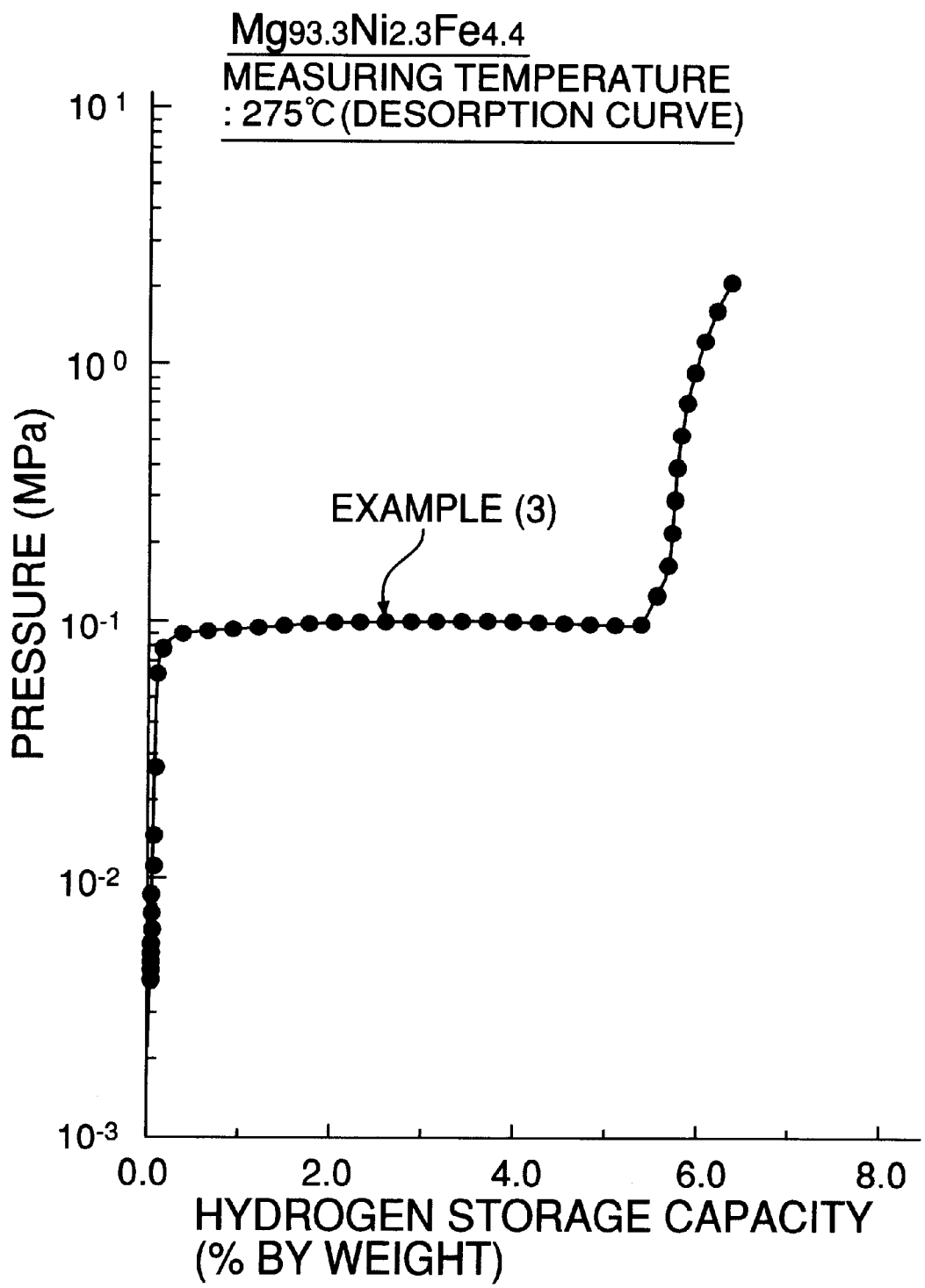
FIG. 17 is a diagram showing a PCT curve for example (3)

FIG. 17 shows a hydrogen desorption curve (PCT curve) as the result of the PCT measurement for example (3). It was ascertained that a hydrogen dissociation temperature in example (3) was dropped by about 15° C., as compared with that in the conventional pure Mg, because of an improvement in thermodynamic properties for the $MgH_2$, described above.

[B-1] Production of Hydrogen Absorbing Alloy Powder by Both of Casting Process and Mechanical Alloying An Mg powder and an Ni powder each having a purity of 99.9% were weighed to provide a composition comprising $Mg_2Ni$, and the weighed materials were molten by a high frequency and then subjected to a casting to produce an ingot. The ingot was roughly pulverized. A powder resulting from the rough pulverization was subjected to a mechanical alloying under the same conditions as those described in the item [A-1], and the collection of a hydrogen absorbing alloy powder was conducted within a globe box. The hydrogen absorbing alloy powder produced in the above manner is called example (06).

[B-2] Observation of Metallographic Structure

Figure 18:
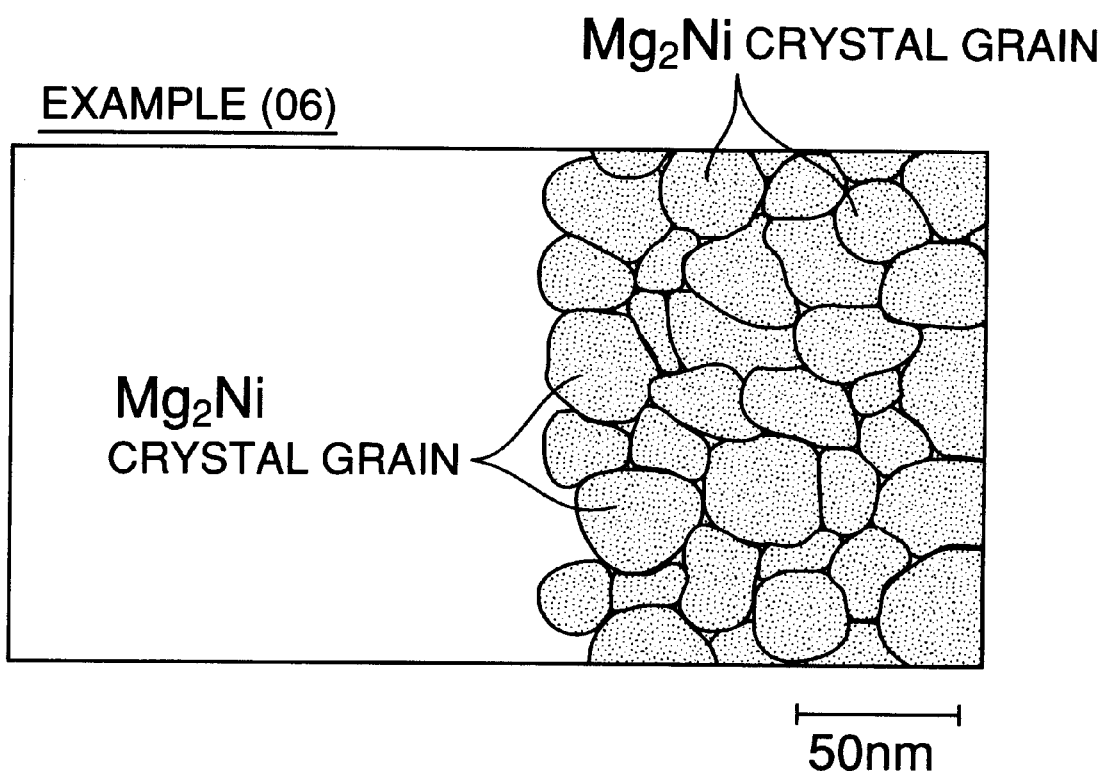
FIG. 18 is a diagram showing an essential portion of a photomicrographic structure of example (06)

Example (06) was subjected to an observation of a metallographic structure using a transmission electronic microscope. FIG. 18 shows an essential portion of a photomicrographic structure of example (06). In FIG. 18, a matrix was formed of crystal grains of $Mg_2Ni$, and the crystal grains had an average grain size D2 equal to or smaller than 50 nm. However, no very small grain exists in each of the crystal grains of $Mg_2Ni$.

[B-3] Hydrogen-desorbing Characteristic

Example (06) was subjected to a dehydrogenating thermal treatment in vacuum for the reason described in the item [A-4] and then to a dehydrogenating speed test at 300° C. according to a vacuum origin process similar to that described above.

Figure 19:
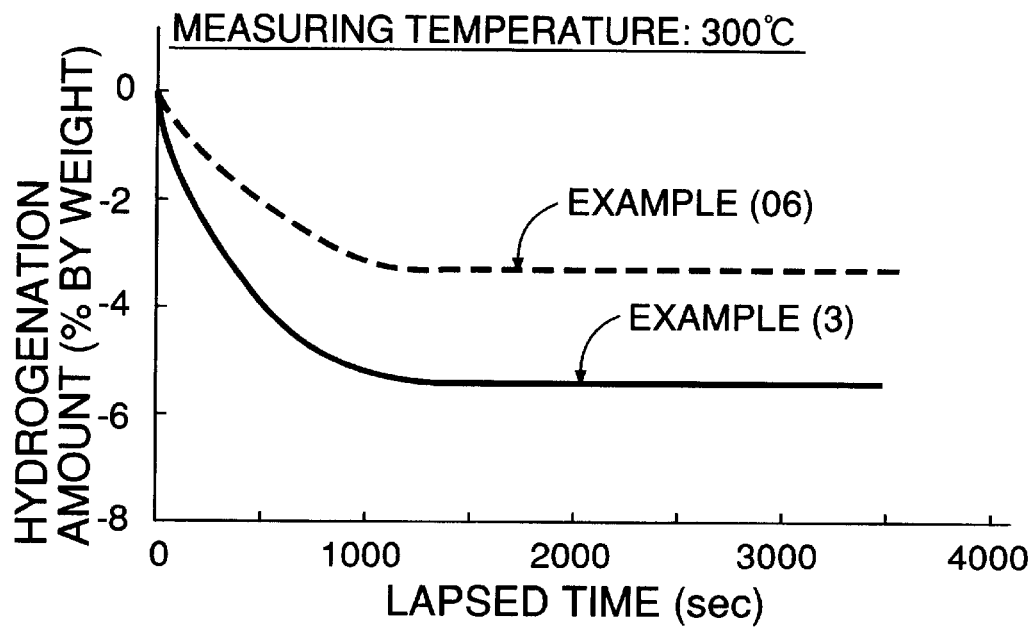
FIG. 19 is a graph showing the relationship between the lapsed time and the hydrogenated amount in the dehydrogenating speed test for examples (3) and (06)
Figure 20:
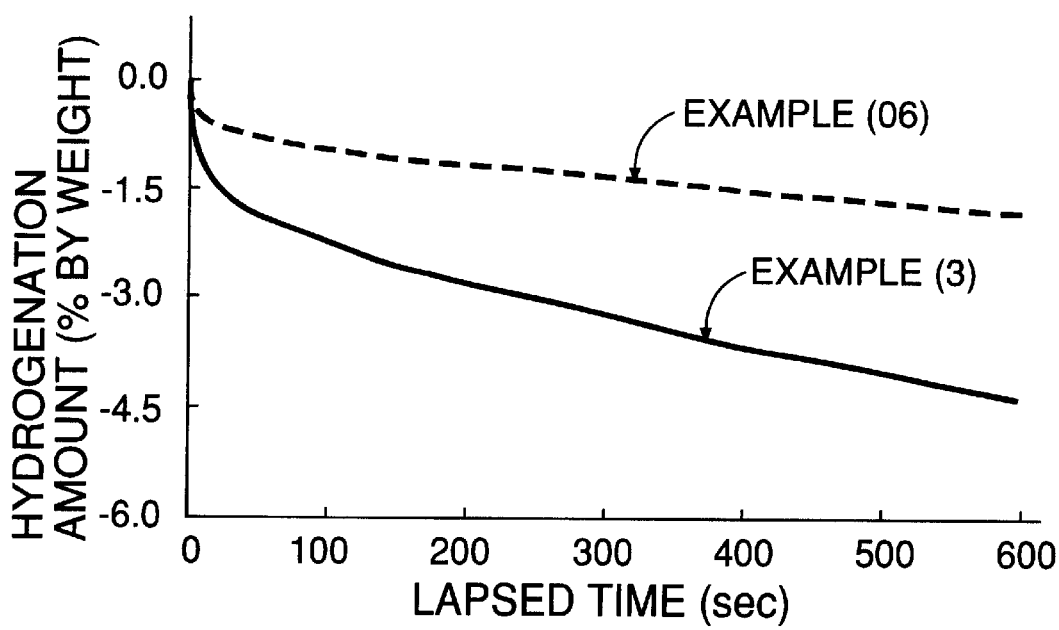
FIG. 20 is an enlarged diagram of an essential portion of FIG. 19.

FIG. 19 shows results of the dehydrogenating speed test, and FIG. 20 is an enlarged diagram from a time point of 0 sec to a time point of 600 sec in FIG. 19. Data (see FIG. 16) regarding example (3) are given in both FIGS. 19 and 20 for comparison. In this case, a hydrogen pressure initially set was 0.03 MPa because of the restriction of plateau pressures at 300° C. for examples (3) and (06) and the specification of the apparatus. The $Mg_2Ni$ alloy has the highest dehydrogenating speed among Mg-based hydrogen absorbing alloys, but as apparent from FIGS. 19 and 20, it can be seen that example (3) has a markedly excellent dehydrogenating speed, as compared with the example (06).

The dehydrogenating thermal treatment may be conducted in a hydrogen atmosphere. In this case, the temperature $\underline{t}$ is set in a range of 80° C.$\leq t \leq$450° C., and the time $\underline{h}$ is set in a range of 0.5 hour$\leq h \leq$10 hours.

According to EMBODIMENT III, it is possible to provide a hydrogen absorbing alloy powder which has an excellent utility such that it has a high hydrogenating speed and a high hydrogen storage capacity without being subjected to the activating treatment and moreover, has a high dehydrogenating speed, and finds a wider industrial application, and to provide a process for producing such hydrogen absorbing alloy powder easily.

EMBODIMENT IV

A hydrogen absorbing alloy powder comprises an amount of AE in a range of 0.1% by weight$\leq$AE$\leq$20% by weight and the balance of Mg. What corresponds to AE is at least one alloy element selected from the group consisting of Ti, V, Mn and Fe, or at least one alloy element selected from the group consisting of Ti, V, Mn, Fe and Ni. The hydrogen absorbing alloy powder has such a nano-sized composite structure that an average grain size D of a plurality of Mg crystal grains constituting a matrix is equal to or smaller than 500 nm, and a plurality of very small grains having an average grain size $\underline{d}$ equal to or smaller than 20 nm are dispersed in each of the Mg crystal grains. The very small grains may exist in a grain boundary.

Such hydrogen absorbing alloy powder is produced using a process which comprises the steps of weighing an AE powder comprising at least one alloy element AE selected from the group consisting of Ti, V, Mn and Fe, or an AE powder comprising at least one alloy element AE selected from the group consisting of Ti, V, Mn, Fe and Ni, and an Mg powder, so that an alloy composition comprises an amount of AE in a range of 0.1% by weight$\leq$AE$\leq$20% by weight and the balance of Mg, throwing the AE powders and the Mg powder into a ball mill, where they are subjected to a mechanical alloying in a hydrogen atmosphere, and then subjecting the resulting material to a dehydrogenating thermal treatment in vacuum or in a hydrogen atmosphere.

In a metallographic structure of a hydrogen absorbing alloy powder resulting from the mechanical alloying, the average grain size D of the Mg crystal grains constituting the matrix is defined to be equal to or smaller than 300 nm, and the average grain size D1 of AE crystal grains is defined to be equal to or smaller than 800 nm in order to finally provide the nano-size composite structure. To satisfy this, the rotational speed of the ball mill in the mechanical alloying is controlled to generate an acceleration 5 times or more and 20 times or less the acceleration of gravity within a container. This ensures that the AE powder and Mg powder can be subjected to a sufficient pulverization and pressure-bonding treatment for alloying, and the metallographic structure of the resulting hydrogen absorbing alloy powder can be finely divided into a nano-size. Hydrogen creating the atmosphere also contributes to such fine division.

However, if the acceleration is smaller than 5 times the acceleration of gravity, the alloying does not advance sufficiently. On the other hand, if the acceleration exceeds 20 times the acceleration of gravity, particles of the alloy powder are agglomerated together and for this reason, a good powder state cannot be maintained, and the metallographic structure is coalesced.

The dehydrogenating thermal treatment is carried out in order to return the Mg hydride produced in the mechanical alloying to the Mg element and to provide the nano-sized composite structure. This treatment is carried out at a temperature $\underline{t}$ set in a range of 80° C.$\leq$t$\leq$450° C., preferably in a range of 330° C.$\leq$t$\leq$380° C. for a time $\underline{t}$ set in a range of 0.5 hour$\leq$h$\leq$10 hours, preferably in a range of 2 hours$\leq$h$\leq$5 hours in vacuum or in a hydrogen atmosphere.

If such conditions regarding the atmosphere, the temperature and the time and/or the conditions for the metallographic structure after the mechanical alloying are not satisfied, a nano-sized composite structure described above cannot be produced.

Particular examples will be described below.

EXAMPLE-I
(A) Production of Hydrogen Absorbing Alloy Powder Utilizing Mechanical Alloying and Dehydrogenating Thermal Treatment An Mg powder and a V powder each having a purity of 99.9% and a particle size smaller than 75 meshes were weighed to provide a hydrogen absorbing alloy composition comprising $Mg_{90}V_{10}$ (the unit of numerical values is % by weight and the same for chemical formulae which will be described hereinafter), and they were mixed to provide 2.5 grams of a powder mixture. The powder mixture was placed into a container (made of JIS SUS316) having a volume of 80 ml in a planetary ball mill (P-5 made by Furitsch) along with eighteen balls (made of JIS SUS316) having a diameter of 10 mm, and the container was evacuated until the inside thereof reached $10^{-3}$ Torr. After the evacuation, the inside of the container was pressurized by hydrogen to 1 MPa, and the powder mixture was subjected to a mechanical alloying under conditions of a container-rotational speed of 780 rpm, a disk-rotational speed of 360 rpm and a treating time of 9 hours. In this case, an acceleration 9 times the acceleration of gravity was generated in the container. After the mechanical alloying, the collection of 2.4 grams of a hydrogen absorbing alloy powder was conducted in a globe box. This powder has a particle size equal to or smaller than 33 $\mu$m.

Figure 21:
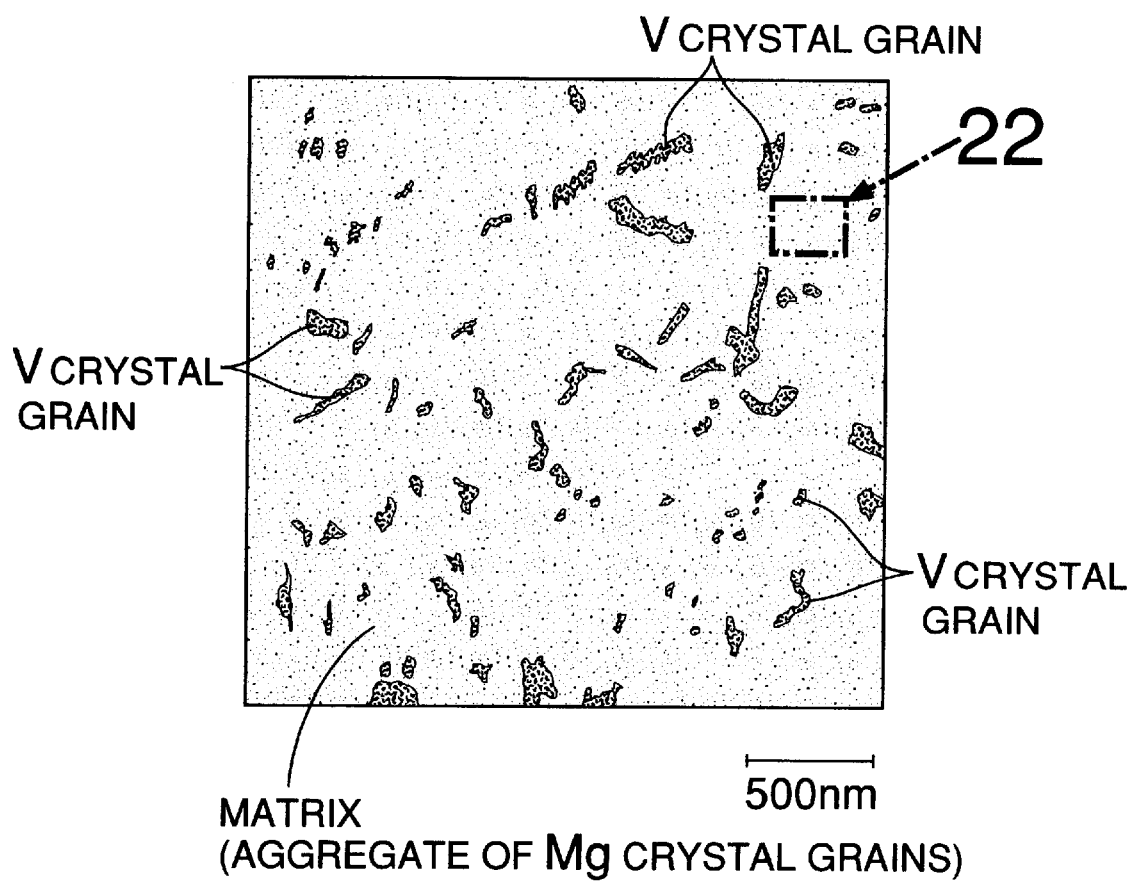
FIG. 21 is a photomicrographic structure diagram of a hydrogen absorbing alloy powder produced through a mechanical alloying.
Figure 22:
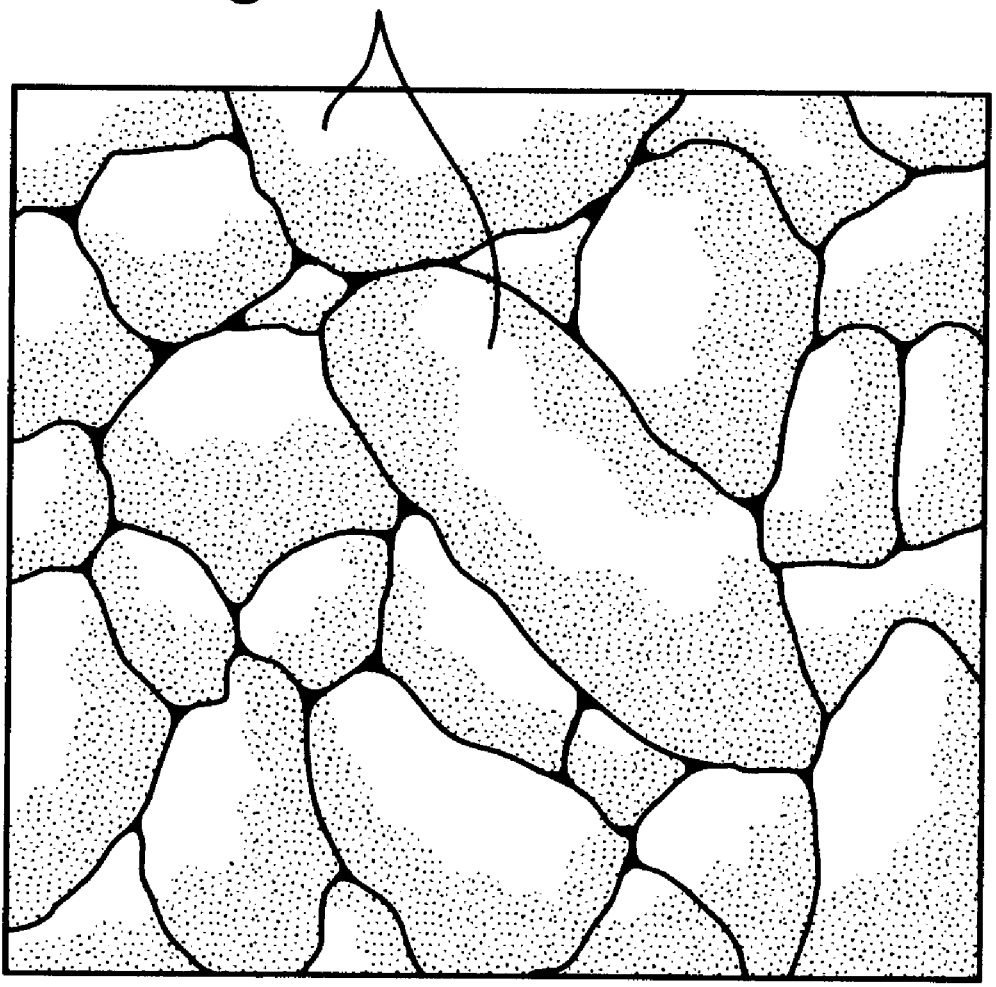
FIG. 22 is an enlarged diagram of a portion indicated by an arrow 22 in FIG. 21.

The hydrogen absorbing alloy powder was subjected to an observation of a metallographic structure using a transmission electronic microscope (TEM) and an accessory EDX (energy dispersion-type X-ray diffraction), thereby providing results shown in FIGS. 21 and 22. In a photomicrographic structure of the alloy powder shown in FIG. 21, it can be seen that a plurality of V crystal grains are dispersed substantially uniformly in a matrix which is an aggregate of a plurality of Mg crystal grains. In this case, the average grain size D of the Mg crystal grains was equal to 8 nm ($\leq$300 nm), and the average grain size D1 of the V crystal grains was equal to 300 nm ($\leq$800 nm).

Figure 23:
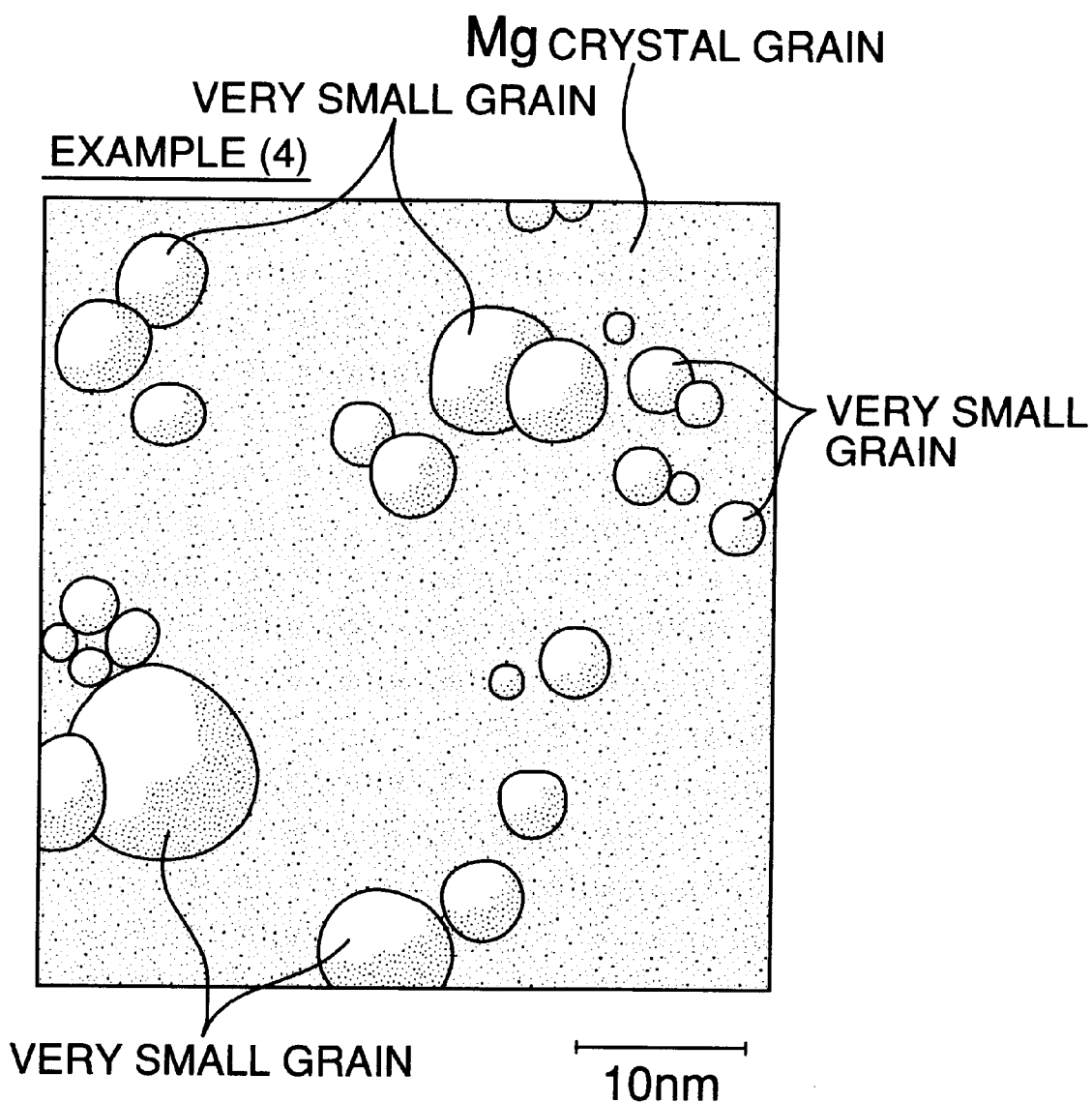
FIG. 23 is a photomicrographic structure diagram of example (4)

Then, the hydrogen absorbing alloy powder was subjected to a dehydrogenating thermal treatment in vacuum under conditions of 350° C. and 3 hours. The resulting hydrogen absorbing alloy powder was subjected to an observation of a metallographic structure in a manner similar to that described above. The result showed that the average grain size D of the Mg crystal grains constituting the matrix was equal to 200 nm, and a plurality of very small grains having an average grain size d equal to or smaller than 15 nm were dispersed in each of the Mg crystal grains (and grain boundaries), as shown in FIG. 23. This hydrogen absorbing alloy powder is called example (4).

(B) Production of Hydrogen Absorbing Alloy Powder Utilizing Casting Process and Activating Treatment An Mg powder and a V powder each having a purity of 99.9% were weighed to provide a hydrogen absorbing alloy composition comprising $Mg_{90}V_{10}$, and the weighed materials were molten by a high frequency and then subjected to a casting to produce an ingot. The ingot was subjected to an observation of a metallographic structure. The result showed that V was little solid-molten in Mg and hence, Mg phases and V phases separated from each other were observed. Then, the ingot was subjected to the pulverization and classification within a globe box to produce and collect a hydrogen absorbing alloy powder having a particle size smaller than 50 $\mu$m. Thereafter, the hydrogen absorbing alloy powder was subjected to an activating treatment. The resulting hydrogen absorbing alloy powder is called example (07). The activating treatment was carried out in the following manner: The powder was placed into a vessel, and the inside of the vessel was evacuated and maintained at 350° C. and under $10^{-4}$ Torr and then pressurized by hydrogen to 4 MPa. The evacuation and pressurization as one cycle were repeated 10 cycles.

A hydrogen absorbing alloy powder having a composition of $Mg_{45.3}Ni_{54.7}$ and a particle size smaller than 50 $\mu$m was produced by sequentially conducting the casting, the pulverization/classification and the activating treatment in the same manner as that described above. This powder is called example (08).

(C) Hydrogen-absorbing/desorbing Characteristics

Example (4) and examples (07) and (08) were subjected to a hydrogenating speed test and a dehydrogenating speed test according to a vacuum origin process defined in a pressure-composition isotherm (a PCT curve) volumetric measuring process (JISH7201).

Figure 24:
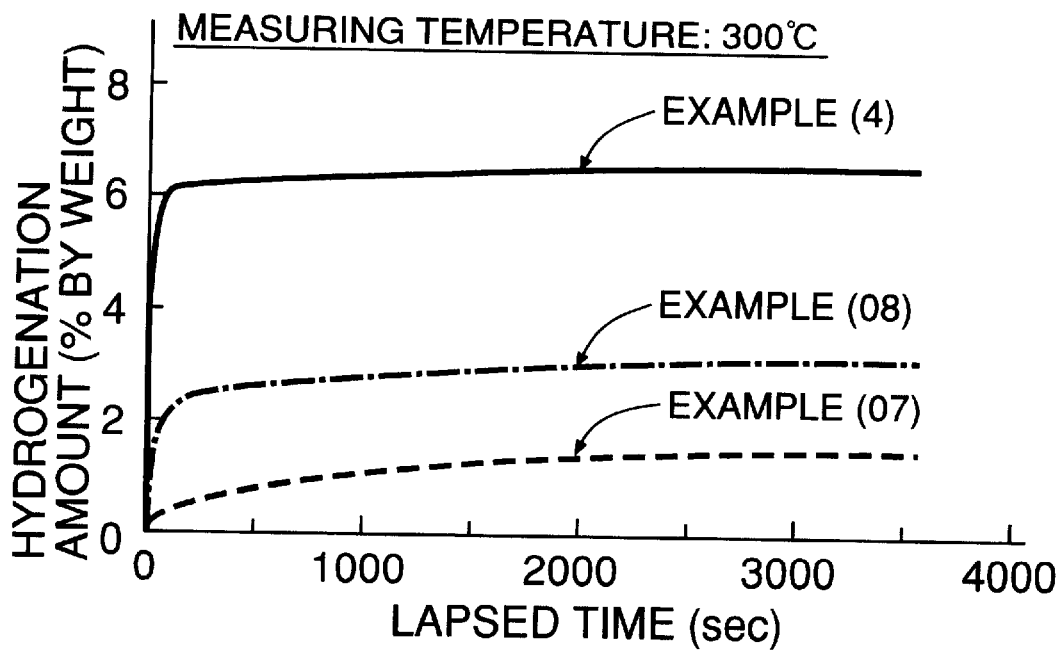
FIG. 24 is a graph showing the relationship between the lapsed time and the hydrogenated amount in the hydrogenating speed test for examples (4), (07) and (08)

FIG. 24 shows results of the hydrogenating speed test at a measuring temperature of 300° C. In this test, a high hydrogen-pressurization was carried out from a vacuum state to 3.2 MPa. A large difference in hydrogenating speed was generated between example (4) and example (07), notwithstanding that they has the same composition ($Mg_{90}V_{10}$), and example (4) has an excellent hydrogenation characteristic such that it absorbs hydrogen in an amount equal to or larger than 6% by weight for 100 seconds after the introduction of hydrogen. Further, example (4) finally has a high hydrogen storage capacity of 6.7% by weight. On the other hand, the Mg alloy forming example (08) belongs to an alloy type having the highest reaction speed among the conventional Mg alloys, but the hydrogenation characteristic of example (4) is excellent as compared with such example (08).

Figure 25:
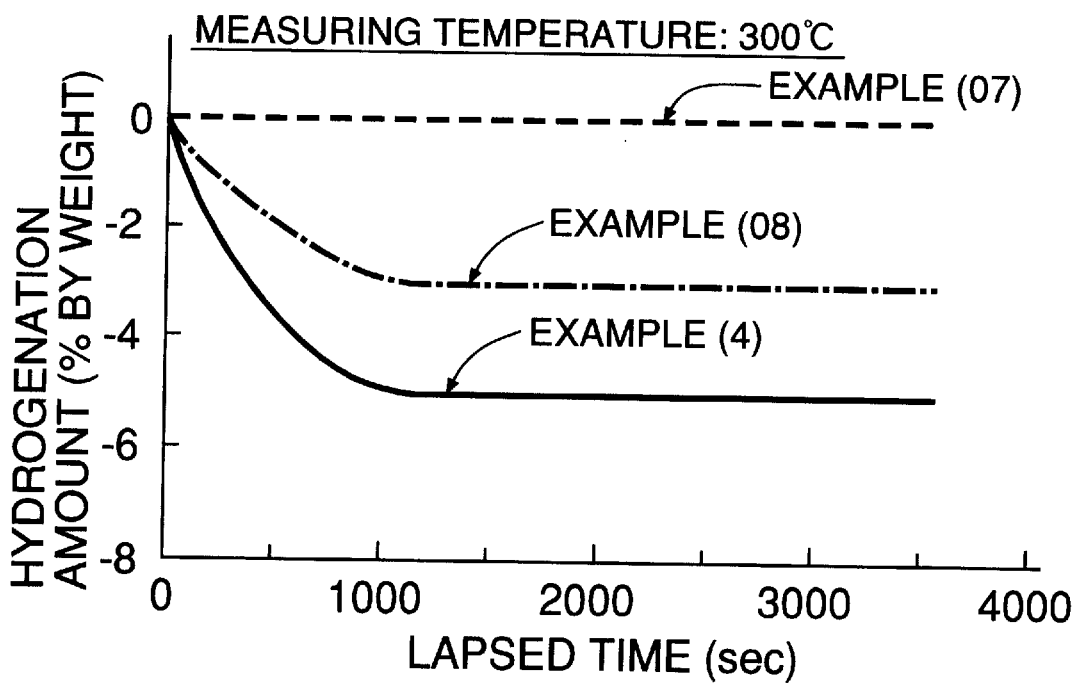
FIG. 25 is a graph showing the relationship between the lapsed time and the hydrogenated amount in the dehydrogenating speed test for examples (4), (07) and (08)

FIG. 25 shows results of the dehydrogenating speed test at a measuring temperature of 300° C. In this case, a hydrogen pressure initially set was 0.03 MPa because of the restriction of plateau pressures at 300° C. for example (4) and examples (07) and (08) and the specification of the apparatus. As apparent from FIG. 25, it can be seen that a falling gradient in a hydrogen desorption curve after starting of the hydrogen desorption is extremely steep in example (4), as compared with example (08) and hence, example (4) has an excellent dehydrogenating speed. In the case of example (07), hydrogen was little desorbed under the initially set pressure of hydrogen, and the same at a time point after lapse of 3,600 seconds. The reason why the amount of hydrogen desorbed in example (4) is constant at about 5% by weight is that the hydrogen pressure in the sample vessel was increased with the hydrogen desorption, and reached an equilibrium dissociation pressure when an amount of hydrogen of about 5% by weight was desorbed.

EXAMPLE II

A hydrogen absorbing alloy powder was produced using 3 grams of an Mg power having a purity of 99.9% by conducting a mechanical alloying under the same conditions as in the item (A) of [EXAMPLE-I] and further conducting an activating treatment similar to that for example (05). This hydrogen absorbing alloy powder is called example (09). Very small grains similar to those existing in example (4) do not exist in example (09). Then, example (09) was subjected to a hydrogenating speed test in a manner similar to that described above. As a result, it was ascertained that example (09) has a high hydrogen storage capacity such that it absorbs hydrogen in an amount equal to or larger than 3.0% by weight for 100 seconds after the introduction of hydrogen, and finally absorbs hydrogen in an amount of 7.4% by weight.

Then, example (4) having the maximum value of the hydrogen storage capacity equal to 6.7% by weight and example (09) having the above-described maximum value of the hydrogen storage capacity were subjected to the following cycle test: The inside of a vessel having example (4) and the like therein was maintained under $1.5\times10^{-3}$ Torr at 330° C. and then pressurized by hydrogen for 60 minutes to 3 MPa, whereby hydrogen was absorbed into example (4) and the like. Then, the inside of the vessel was evacuated and maintained under $1.5\times10^{-3}$ Torr for 120 minutes and during this time, absorbed hydrogen was desorbed from example (4) and the like. Such an operation as one cycle was repeated. Table 1 shows results of the cycle test.

TABLE 1

| | Before cycle test | After 500 cycles | | After 1,000 cycles | |
|---|---|---|---|---|---|
| | hydrogen storage capacity x | hydrogen storage capacity y | y/x | hydrogen storage capacity z | z/x |
| Example 4 | 6.7% by weight | 6.5% by weight | 0.97 | 6.4% by weight | 0.96 |
| Example (09) | 7.4% by weight | 5.1% by weight | 0.69 | 4.4% by weight | 0.59 |

As apparent from Table 1, in the case of example (4), the hydrogen storage capacity is little varied even after 1,000 cycles from that before the test, but in the case of example (09), the hydrogen storage capacity after 1,000 cycles is decreased to approximately 60% of that before the test.

This is due to the following reason: The temperature of example (4) and the like rises to about 430° C. due to the hydrogen pressurization to 3 MPa in the cycle test, and the very small grains in example (4) cannot be coalesced even if the temperature rise occurs, whereby the coalescence of the Mg crystal grains constituting the matrix is also inhibited, and the nano-sized composite structure described above is maintained even if the temperature rise occurs. In general, if the Mg element and the Mg alloy are heated to 200° C. or mote, the coalescence of the crystal grains occurs, not excepting case of the example (09) experiencing a temperature rising course as described above. Moreover, the sintering solidification also occurs, and due to this, the hydrogen-absorbing characteristic is deteriorated with the passage of time.

EXAMPLE-III

An Mg powder, a V powder and an Mn powder each having a purity of 99.9% and a particle size smaller than 200 μm (75 meshes) were weighed to provide a hydrogen absorbing alloy composition comprising $Mg_{93.8}V_{5.1}Mn_{1.1}$, and they were mixed to provide 3 grams of a powder mixture. The powder mixture was subjected sequentially to a mechanical alloying and a dehydrogenating thermal treatment under the same conditions as in the item (A) of [EXAMPLE-I] to produce a hydrogen absorbing alloy powder. This powder is called example (5).

In addition, an Mg powder and a Ti powder each having a purity of 99.9% and a particle size smaller than 200 μm (75 meshes) were weighed to provide a hydrogen absorbing alloy composition comprising $Mg_{94.3}Ti_{5.7}$, and they were mixed to provide 3 grams of a powder mixture. The hydrogen absorbing alloy powder was subjected sequentially to a mechanical alloying and a dehydrogenating thermal treatment under the same conditions as for example (5). This powder is called example (6).

Examples (5) and (6) were subjected to an observation of a metallographic structure using a transmission electronic microscope and an accessory EDX. As a result, it was ascertained that the photomicrographic structure of each of the examples (5) and (6) was such that the average grain size D of Mg crystal grains constituting a matrix was equal to or smaller than 500 nm, and a plurality of very small grains having an average grain sized $\underline{d}$ equal to or smaller than 20 nm were dispersed in each of the Mg crystal grains and grain boundaries.

Figure 26:
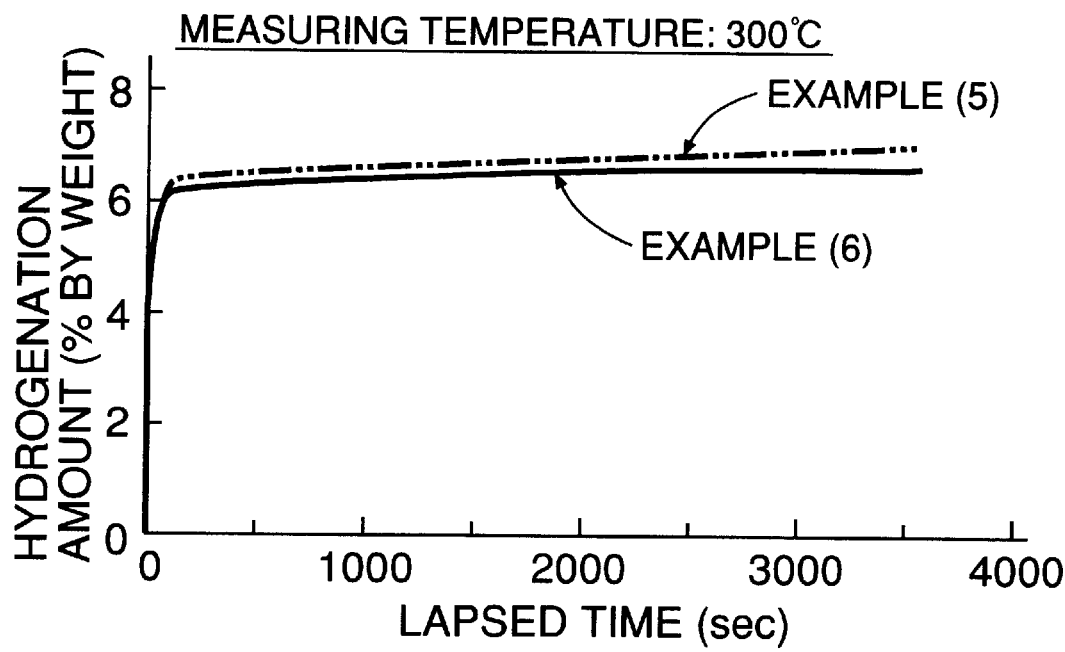
FIG. 26 is a graph showing the relationship between the lapsed time and the hydrogenated amount in the hydrogenating speed test for examples (5) and (6)

Examples (5) and (6) were subjected to a hydrogenating speed test and a dehydrogenating speed test at 300° C. according to a vacuum origin process defined in a pressure-composition isotherm (a PCT curve) volumetric measuring process (JISH7201). FIG. 26 shows results of the hydrogenating speed test at a measuring temperature of 300° C. In this test, a high hydrogen-pressurization was carried out from a vacuum state to 3.2 MPa. Example (6) has an excellent hydrogenation characteristic similar to that of example (4), such that it absorbs hydrogen in an amount equal to or larger than 6% by weight for 100 seconds after the introduction of hydrogen. Example (6) finally has a high hydrogen storage capacity equal to 6.7% by weight. Example (5) has a hydrogenation characteristic superior to example (6) and finally has a hydrogen storage capacity equal to 7.1% by weight.

Figure 27:
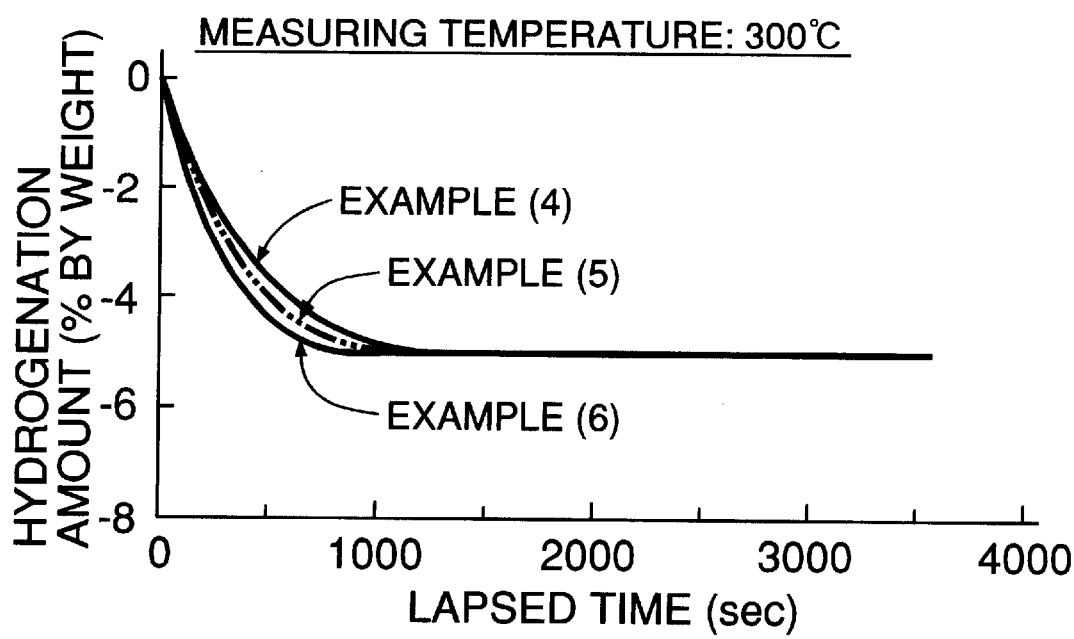
FIG. 27 is a graph showing the relationship between the lapsed time and the hydrogenated amount in the dehydrogenating speed test for examples (4) to (6)

FIG. 27 shows results of the dehydrogenating speed test at a measuring temperature of 300° C. In this case, a hydrogen pressure initially set was 0.03 MPa because of the restriction of plateau pressures at 300° C. for examples (5) and (6) and the specification of the apparatus. As apparent from FIG. 27, it can be seen that a falling gradient in a hydrogen desorption curve after starting of the hydrogen desorption is steep in examples (5) and (6), as compared with example (4) and hence, each of examples (5) and (6) has more excellent dehydrogenating speed than example (4). The reason why the amount of hydrogen desorbed in each of examples (5) and (6) is constant at about 5% by weight is that the hydrogen pressure in the sample vessel was increased with the hydrogen desorption, and reached an equilibrium dissociation pressure when an amount of hydrogen of about 5% by weight was desorbed, as described above.

Figure 28:
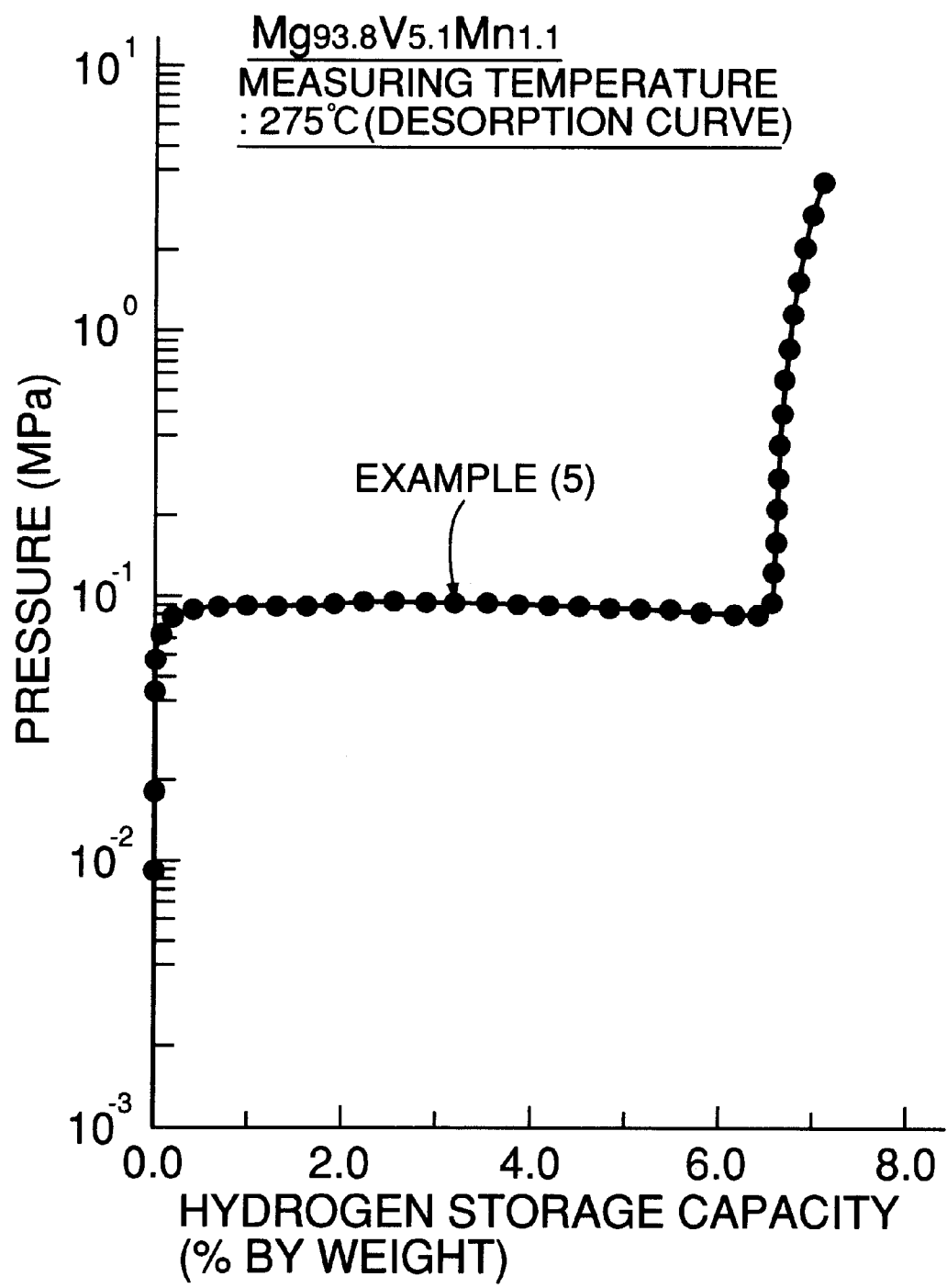
FIG. 28 is a diagram showing a PCT curve for example (5)
Figure 29:
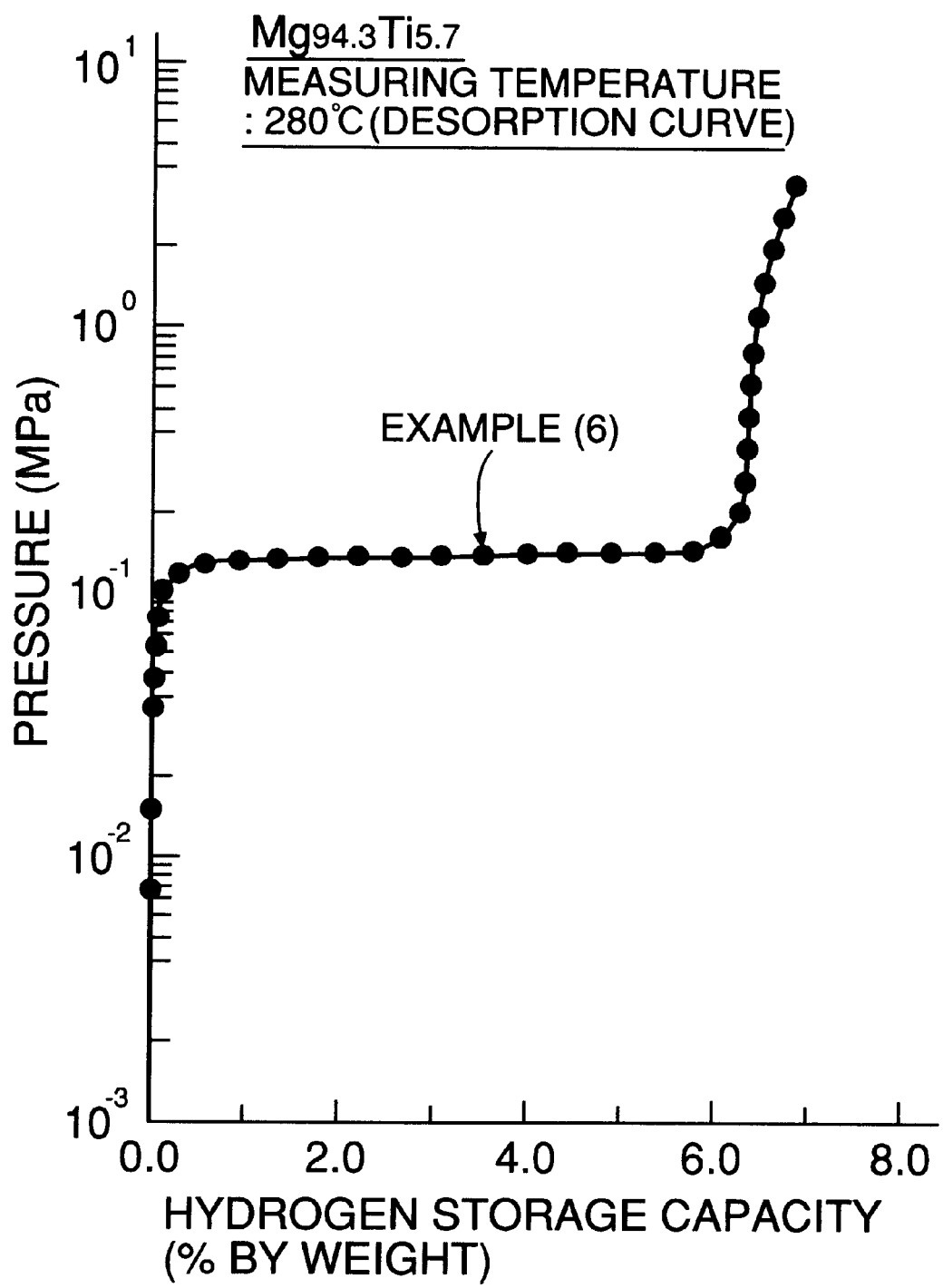
FIG. 29 is a diagram showing a PCT curve for example (6)

FIGS. 28 and 29 show hydrogen desorption curves (PCT curves) for examples (5) and (6), respectively. As with measuring conditions, the waiting time was set at 5 minutes, and the determination of plateau was set at 0.3 Log(P)/(% by weight).

The contents of V and Mn in the MgVMn-based hydrogen absorbing alloy as described above are set in a range of 2% by weight≦V≦8% by weight and in a range of 0.5% by weight≦Mn≦4% by weight, respectively. In this case, if the contents of V and Mn do not meet the above ranges, V and Mn are preferentially alloyed, and very small grains are coalesced and hence, such contents are not preferred.

In the MgTi-based hydrogen absorbing alloy as described above, the content of Ti is set in a range of 4% by weight≦Ti≦15% by weight. In this case, if the content of Ti is lower than 4% by weight, an initial activity is lowered. On the other hand, if Ti>15% by weight, the hydrogen storage capacity is decreased.

EXAMPLE-IV

An Mg powder, an Ni powder and an Fe powder each having a purity of 99.9% and a particle size smaller than 200 $\mu$m (75 meshes) were weighed to provide a hydrogen absorbing alloy composition comprising $Mg_{93.2}Ni_{4.6}Fe_{2.2}$, and they were mixed to provide 3 grams of a powder mixture. The powder mixture was subjected sequentially to a mechanical alloying and a dehydrogenating thermal treatment under the same conditions as in the item (A) of [EXAMPLE-I] to produce a hydrogen absorbing alloy powder. This powder is called example (7).

In addition, an Mg powder, an Ni powder and an Fe powder each having a purity of 99.9% were weighed to provide a hydrogen absorbing alloy composition comprising $Mg_{93.2}Ni_{4.6}Fe_{2.2}$, and the weighed materials were subjected sequentially to the casting, the pulverization/classification and the activating treatment similar to those in the item (B) of [EXAMPLE-I] to produce a hydrogen absorbing alloy powder. This powder is called example (010).

Example (7) was subjected to an observation of a metallographic structure using a transmission electronic microscope and an accessory EDX. As a result, it was ascertained that the photomicrographic structure of example (7) was such that the average grain size D of Mg crystal grains constituting a matrix was equal to or smaller than 500 nm, and a plurality of very small grains having an average grain size $\underline{d}$ equal to or smaller than 20 nm were dispersed in each of the Mg crystal grains.

In example (010), the average grain size D of Mg crystal grains constituting a matrix was equal to or smaller than 3 $\mu$m, and the presence of very small grains in each of the Mg crystal grains was not observed, but the segregation of Fe was generated in the metallographic structure.

Example (7) and example (010) were subjected to a hydrogenating speed test and a dehydrogenating speed test at 300° C. according to a vacuum origin process defined in a pressure-composition isotherm (a PCT curve) volumetric measuring process (JISH7201) as described above.

Figure 30:
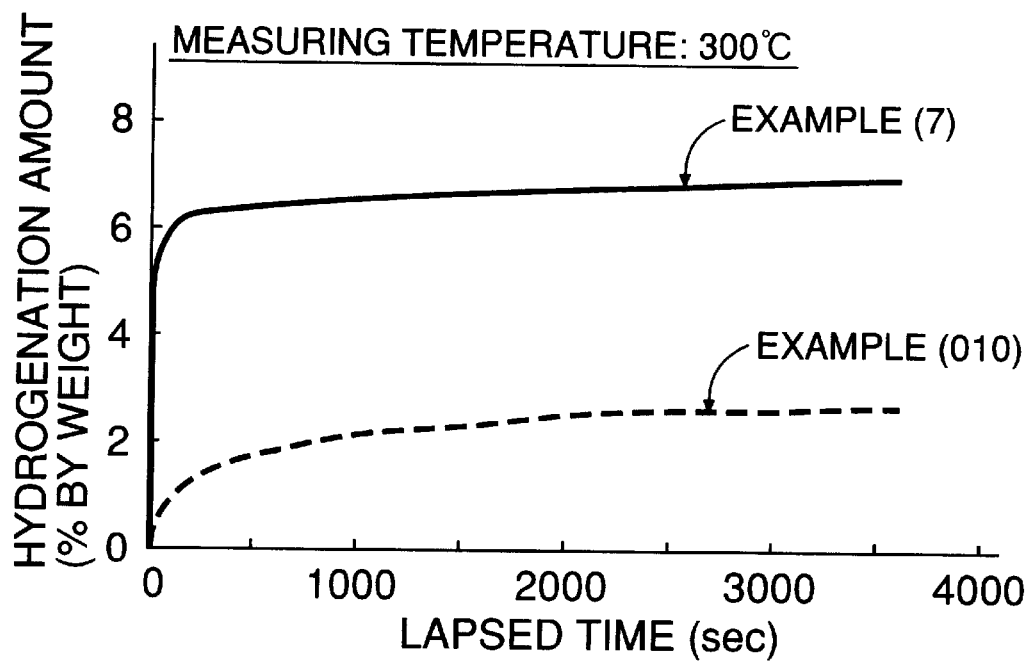
FIG. 30 is a graph showing the relationship between the lapsed time and the hydrogenated amount in the hydrogenating speed test for examples (7) and (010)

FIG. 30 shows results of the hydrogenating speed test at a measuring temperature of 300° C. In this test, a high hydrogen-pressurization was carried out from a vacuum state to 3.2 MPa. A large difference in hydrogenating speed was generated between example (7) and example (010), notwithstanding that they has the same composition ($Mg_{93.2}Ni_{4.6}Fe_{2.2}$). Example (7) has an excellent hydrogenation characteristic such that it absorbs hydrogen in an amount equal to or larger than 5% by weight for 60 seconds after the introduction of hydrogen. Further, example (7) finally has a high hydrogen storage capacity of 7.0% by weight.

Figure 31:
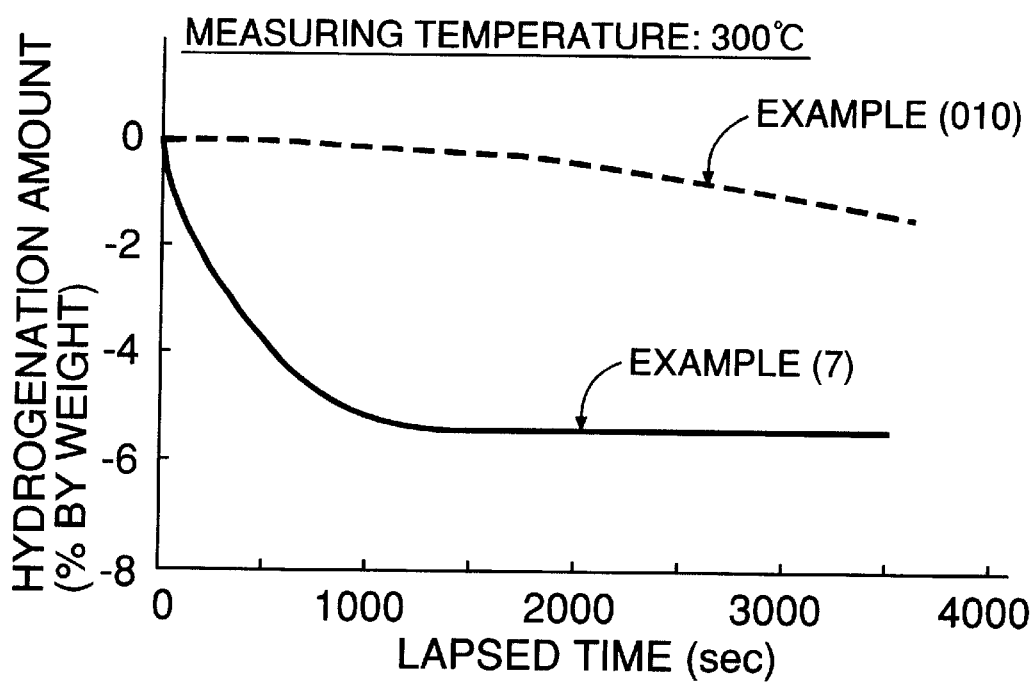
FIG. 31 is a graph showing the relationship between the lapsed time and the hydrogenated amount in the dehydrogenating speed test for examples (7) and (010).

FIG. 31 shows results of the dehydrogenating speed test at a measuring temperature of 300° C. In this case, a hydrogen pressure initially set was 0.03 MPa because of the restriction of plateau pressures at 300° C. for example (7) and example (010) and the specification of the apparatus. As apparent from FIG. 31, it can be seen that a falling gradient in a hydrogen desorption curve after starting of the hydrogen desorption is extremely steep in example (7), as compared with example (010) and hence, example (7) has an excellent dehydrogenating speed. The reason why the amount of hydrogen desorbed in example (7) is constant at about 5.3% by weight is that the hydrogen pressure in the sample vessel was increased with the hydrogen desorption, and reached an equilibrium dissociation pressure when an amount of hydrogen of about 5.3% by weight was desorbed.

According to EXAMPLE IV, it is possible to provide a hydrogen absorbing alloy powder which has an excellent utility such that it has a high hydrogenating speed and a high hydrogen storage capacity without being subjected to the activating treatment and moreover, has a high dehydrogenating speed and an excellent durability, and finds a wider industrial application, and to provide a process for producing such hydrogen absorbing alloy powder easily.

What is claimed is:

1. A process for producing a hydrogen absorbing alloy powder, comprising the steps of throwing a starting powder into a ball mill, in which an AE powder comprising at least one alloy element AE selected from the group consisting of Ti, V, Mn, Fe, Ni, Cu and Al, and an Mg powder are weighed so that an alloy composition comprises an amount of AE in a range of 0.1% by weight$\leq$AE$\leq$20% by weight and the balance of Mg, and subjecting the starting powder to a mechanical alloying in a hydrogen atmosphere to provide a hydrogen absorbing alloy powder comprising an Mg alloy powder;

wherein in said mechanical alloying, an acceleration 5 times or more and 20 times or less the acceleration of gravity is generated within a container of the ball mill;

wherein said hydrogen absorbing alloy powder has a hydrogenation rate equal to or higher than 50%;

wherein said hydrogen absorbing alloy powder is subjected to a dehydrogenating thermal treatment at a temperature t set in a range 80° C.$\leq$t$\leq$450° C. and for a time h set in a range of 0.5 hour$\leq$h$\leq$10 hours either in vacuum or in a hydrogen atmosphere; and wherein said hydrogen absorbing alloy powder after being subjected to the dehydrogenating thermal treatment has a particle size $d_0$ in a range of 0.1 $\mu$m$\leq d_0 \leq$200 $\mu$m, and includes a plurality of metal crystal grains constituting a matrix and having an average grain size D in a range of 100 nm$\leq$D$\leq$500 nm.

2. A process for producing a hydrogen absorbing alloy powder, comprising the steps of throwing a starting powder into a container of a ball mill, and charging hydrogen into said container to conduct a mechanical alloying, hydrogen being charged again into the container at an intermediate stage of said mechanical alloying;

wherein the hydrogenation rate A of said hydrogen absorbing alloy powder is equal to or higher than 50%;

wherein said hydrogen absorbing alloy powder is subjected to a dehydrogenating thermal treatment at a temperature t set in a range 80° C.$\leq$t$\leq$450° C. and for a time h set in a range of 0.5 hour$\leq$h$\leq$10 hours in a hydrogen atmosphere; and wherein said hydrogen absorbing alloy powder after being subjected to said dehydrogenating thermal treatment has a particle size $d_0$ in a range of 0.1 $\mu$m$\leq d_0 \leq$200 $\mu$m, and includes a plurality of metal crystal grains constituting a matrix and having an average grain size D in a range of 100 nm$\leq$D$\leq$500 nm.

3. A process for producing a hydrogen absorbing alloy powder according to claim 2, wherein said hydrogen absorbing alloy powder is an Mg alloy powder.

4. A process for producing a hydrogen absorbing alloy powder according to claim 3, wherein said Mg alloy powder comprises an amount of AE in a range of 0.26% by weight$\leq$AE$\leq$12% by weight and the balance of Mg, said AE being at least one alloy element selected from the group consisting of Ti, V, Mn, Fe, Ni, Cu and Al.

5. A process for producing a hydrogen absorbing alloy powder, comprising the steps of weighing an AE powder comprising at least one alloy element AE selected from the group consisting of Ti, V, Mn, Fe and Ni, and an Mg powder to provide an alloy composition comprising an amount of AE in a range of 0.1% by weight$\leq$AE$\leq$20% by weight and the balance of Mg, and throwing said AE powder and said Mg powder into a ball mill, where said AE powder and Mg powder are subjected to a mechanical alloying in a hydrogen atmosphere and then to a dehydrogenating thermal treatment either in vacuum or in a hydrogen atmosphere, thereby providing a hydrogen absorbing alloy powder which includes a plurality of Mg crystal grains constituting a matrix and having an average grain size D equal to or smaller than 500 nm, and a plurality of very small grains having an average grain size $\underline{d}$ equal to or smaller than 20 nm and dispersed in each of the Mg crystal grains and in each of grain boundaries.

6. A process for producing a hydrogen absorbing alloy powder according to claim 5, wherein in a metallographic structure of the alloy resulting from said mechanical alloying, the average grain size D of the plurality of Mg crystal grains constituting the matrix is defined at D$\leq$300 nm, and the average grain size D1 of the plurality of AE crystal grains is defined at D1$\leq$800 nm.

7. A process for producing a hydrogen absorbing alloy powder according to claim 6, wherein in said mechanical alloying, an acceleration 5 times or more and 20 times or less the acceleration of gravity is generated within a container of the ball mill.

8. A process for producing a hydrogen absorbing alloy powder according to claim 5, 6, or 7, wherein said dehydrogenating thermal treatment is conducted at a temperature $\underline{t}$ set in a range 80° C.$\leq$t$\leq$450° C. and for a time $\underline{h}$ set in a range of 0.5 hour$\leq$h$\leq$10 hours.

* * * * *